US010020590B2

(12) United States Patent
Schmalenberg et al.

(10) Patent No.: US 10,020,590 B2
(45) Date of Patent: Jul. 10, 2018

(54) GRID BRACKET STRUCTURE FOR MM-WAVE END-FIRE ANTENNA ARRAY

(71) Applicant: Toyota Motor Engineering & Manufacturing North America, Inc., Erlanger, KY (US)

(72) Inventors: Paul D. Schmalenberg, Ann Arbor, MI (US); Meijiao Li, Davis, CA (US); Jae Seung Lee, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 139 days.

(21) Appl. No.: 15/213,690

(22) Filed: Jul. 19, 2016

(65) Prior Publication Data

US 2018/0026376 A1   Jan. 25, 2018

(51) Int. Cl.
*H01Q 1/32* (2006.01)
*H01Q 13/20* (2006.01)
*H01Q 3/00* (2006.01)

(52) U.S. Cl.
CPC ........... *H01Q 13/20* (2013.01); *H01Q 1/3233* (2013.01); *H01Q 1/3283* (2013.01); *H01Q 3/005* (2013.01)

(58) Field of Classification Search
CPC ..... H01Q 1/3233; H01Q 1/3283; H01Q 5/005
See application file for complete search history.

(56) References Cited

U.S. PATENT DOCUMENTS 4,298,873 A   11/1981   Roberts
4,414,550 A   11/1983   Tresselt
(Continued)

FOREIGN PATENT DOCUMENTS

CN   104122556   10/2014
DE   102013100554   1/2013
(Continued)

OTHER PUBLICATIONS

Djerafi, et al.; "Innovative Multilayered Millemetre-Wave Antennas for Multi-Dimensional Scanning and Very Small Footprint Applications"; *6th European Conference on Antennas and Propagation (EUCAP)*; pp. 2583-2587; Mar. 26, 2012.
(Continued)

*Primary Examiner* — Hoang Nguyen
*Assistant Examiner* — Awat Salih
(74) *Attorney, Agent, or Firm* — Snell & Wilmer LLP

(57) ABSTRACT

Bracket structures that structurally support and enhance the performance of millimeter-wave tapered-slot end-fire antennas for use in vehicular radar systems. The system includes a first longitudinal rib and a second longitudinal rib, each defining a first longitudinal slot and having a transmission end and a chip connection end. The system includes a crossbeam coupled to the first longitudinal rib and the second longitudinal rib. The system includes a first end-fire antenna having a transmission end that is received by the first longitudinal slot and a chip connection end. The first end-fire antenna is designed to transmit a first signal having a first phase. The system includes a second end-fire antenna having a transmission end that is received by the second longitudinal slot and a chip connection end. The second end-fire antenna is designed to transmit a second signal having a second phase that is different than the first phase.

18 Claims, 14 Drawing Sheets

(56) References Cited

U.S. PATENT DOCUMENTS

| | | | |
|---|---|---|---|
| 5,023,623 | A | 6/1991 | Kreinheder et al. |
| 5,023,624 | A | 6/1991 | Heckaman et al. |
| 5,227,808 | A | 7/1993 | Davis |
| 5,400,042 | A | 3/1995 | Tulintseff |
| 5,486,832 | A | 1/1996 | Hulderman |
| 5,557,291 | A | 9/1996 | Chu et al. |
| 5,767,793 | A | 6/1998 | Agravante et al. |
| 5,872,542 | A | 2/1999 | Simons et al. |
| 5,874,915 | A | 2/1999 | Lee et al. |
| 5,940,011 | A | 8/1999 | Agravante et al. |
| 6,046,703 | A | 4/2000 | Wang et al. |
| 6,061,035 | A | 5/2000 | Kinasewitz et al. |
| 6,154,176 | A | 11/2000 | Fathy et al. |
| 6,317,094 | B1 | 11/2001 | Wu et al. |
| 6,366,254 | B1 | 4/2002 | Sievenpiper et al. |
| 6,496,151 | B1 | 12/2002 | Ferreri et al. |
| 6,496,155 | B1 | 12/2002 | Sievenpiper et al. |
| 6,549,170 | B1 | 4/2003 | Kuo et al. |
| 6,624,845 | B2 | 9/2003 | Loyd et al. |
| 6,815,739 | B2 | 11/2004 | Huff et al. |
| 6,950,062 | B1 | 9/2005 | Mather et al. |
| 7,109,938 | B2 | 9/2006 | Franson et al. |
| 7,170,446 | B1 | 1/2007 | West et al. |
| 7,268,732 | B2 | 9/2007 | Gotzig et al. |
| 7,411,542 | B2 | 8/2008 | O'Boyle |
| 7,532,170 | B1 | 5/2009 | Lee et al. |
| 7,728,772 | B2 | 6/2010 | Mortazawi et al. |
| 7,742,004 | B2 | 6/2010 | Fukushima et al. |
| 7,821,355 | B2 | 10/2010 | Engel et al. |
| 7,924,226 | B2 | 4/2011 | Soler Castany et al. |
| 8,175,512 | B2 | 5/2012 | Cornwell |
| 8,259,032 | B1 | 9/2012 | Buckley |
| 8,319,678 | B2 | 11/2012 | Weiss |
| 8,405,468 | B2 | 3/2013 | Uchaykin |
| 8,576,111 | B2 | 11/2013 | Smith et al. |
| 8,604,991 | B2 | 12/2013 | Nagayama |
| 8,836,592 | B2 | 9/2014 | Paulus et al. |
| 8,902,117 | B2 | 12/2014 | Ohno et al. |
| 8,912,968 | B2 | 12/2014 | Sharma et al. |
| 8,922,448 | B2 | 12/2014 | Wong et al. |
| 8,952,678 | B2 | 2/2015 | Giboney |
| 9,013,365 | B2 | 4/2015 | Lee et al. |
| 9,065,163 | B1 | 6/2015 | Wu et al. |
| 9,142,889 | B2 | 9/2015 | Pazin et al. |
| 9,214,739 | B2 | 12/2015 | Saver et al. |
| 9,225,058 | B2 | 12/2015 | DeVries et al. |
| 9,337,542 | B2 | 5/2016 | Coburn et al. |
| 9,397,740 | B2 * | 7/2016 | Maltsev .......... H01Q 3/40 |
| 2005/0225481 | A1 | 10/2005 | Bonthron |
| 2006/0044189 | A1 | 3/2006 | Livingston et al. |
| 2012/0194377 | A1 | 8/2012 | Yukumatsu et al. |
| 2012/0235881 | A1 | 9/2012 | Pan et al. |
| 2012/0295015 | A1 | 11/2012 | Yang |
| 2013/0027268 | A1* | 1/2013 | Ohno .......... H01Q 9/285 343/818 |
| 2013/0076579 | A1 | 3/2013 | Zhang et al. |
| 2013/0201076 | A1 | 8/2013 | Vos et al. |
| 2014/0070994 | A1 | 3/2014 | Schmalenberg et al. |
| 2014/0266902 | A1 | 9/2014 | Kamgaing et al. |
| 2015/0070228 | A1 | 3/2015 | Gu et al. |
| 2015/0130673 | A1 | 5/2015 | Ng et al. |
| 2015/0268336 | A1 | 9/2015 | Yukumatsu et al. |
| 2015/0333408 | A1* | 11/2015 | Ohno .......... H01Q 1/38 343/819 |
| 2016/0033638 | A1 | 2/2016 | Silc |
| 2016/0125713 | A1 | 5/2016 | Blech et al. |

FOREIGN PATENT DOCUMENTS

| | | |
|---|---|---|
| WO | WO 01/52352 | 7/2001 |
| WO | WO 2009092695 | 7/2009 |
| WO | WO 2012076994 | 6/2012 |
| WO | WO 2014184554 | 11/2014 |

OTHER PUBLICATIONS

Tahim et al.; "Multi-Band Antenna Technology;" *Antennas and Propagation Society International Symposium, 2004. IEEE*; vol. 4; pp. 3968-3971; Jun. 20, 2004.

Ranade, et al.; "Design of a Substrate Integrated Waveguide H Plane Horn Antenna on a PTFE Substrate for Automotive Radar Application;" *Applied Electromagnetics Conference (AEMC), 2011 IEEE*; 4 pages; Dec. 18, 2011.

Beer et al.; "Novel Antenna Concept for Compact Millimeter-Wave Automotive Radar Sensors;" *IEEE Antennas and Wireless Propagation Letters*; vol. 8; pp. 771-774; Jul. 7, 2009.

Choukiker et al.; "Hybrid Fractal Planar Monopole Antenna Covering Multiband Wireless Communication with MIMO Implementation for Handheld Mobile Devices;" *IEEE Transactions on Antennas and Propagation*; vol. 62; No. 3; pp. 1483-1488; Dec. 17, 2013.

Li et al.; "A Compact Wideband MIMO Antenna with Two Novel Bent Slits;" *IEEE Transactions on Antennas and Propagation*; vol. 60; No. 2; pp. 482-489; Feb. 2012.

Yang; "Dual Band-Notched Ultrawideband MIMO Antenna Array;" *Wireless Symposium (IWS), 2013 IEEE International*; 4 pages; Apr. 18, 2013.

Shamsinejad et al.; "Microstrip-Fed and 3-D Folded Slot Antenna on Cubic Structure;" *IEEE Antennas and Wireless Propagation Letters*; vol. 15; pp. 1081-1084; 2016.

Li, Yuan; "Development of Micromachined Millimeter Wave Modules for Wireless Communication Systems;" Georgia Institute of Technology; 128 pages; Aug. 2010.

Bisognin et al.; "3D Printed Plastic 60 GHz Lens: Enabling Innovative Millimeter Wave antenna Solution and System;" *2014 IEEE MTT-S International Microwave Symposium (IMS2014)*; 4 pages; Jun. 1, 2014.

Jansen et al.; "Antenne Design for 24 GHz and 60 GHz Emerging Microwave Applications;" *Koninklijke Philips Electronics N.V. 2006*; 137 pages; Jul. 2006.

Dhiman et al.; "Effect of DGS Technique in MIMO Antenna;" *International Journal of Current Engineering and Technology*; vol.; No. 5; pp. 3138-3141; Oct. 2015.

Schwering, Felix K.; "Millimeter Wave Antennas;" *Proceedings of the IEEE*; vol. 80; No. 1; pp. 92-102; Jan. 1992.

Harvey et al. "Spatial Power Combining for High-Power Transmitters" *IEEE Microwave*; pp. 48-59; Dec. 2000.

Larumbe-Gonzalo et al. "Coherently Fed Frequency Scanning Phased Array Structure for Imaging Applications" IEEE 6th European Conference on Antennas and Propagation (EUCAP); pp. 2802-2806; 2011.

Li et al. "Dual-Beam Steering Microstrip Leaky Wave Antenna with Fixed Operating Frequency" *IEEE Transactions on Antennas and Propagation*; vol. 56, No. 1; pp. 248-252; Jan. 2008.

Ramadurgakar, Ameya "X Band Substrate Integrated Horn Array Antenna for Future Advanced Collison Avoidance System" Drexel University; 133 pages; 2011.

Ye et al.; "A Dual-Band Printed End-Fire antenna with DSPSL Feeding" 6 pages; Dec. 17, 2015.

Amadjikpè "Integrated 60-GHz Antenna on Multilayer Organic Package with Broadside and End-Fire Radiation" *IEEE Transactions on Microwave Theory and Techniques*, vol. 61, No. 1, pp. 303-315; Jan. 2013.

Litzenberger et al.; "Study of Waveguide Antenna Implemented in Laminated Material" Dec. 2002.

Schoenlinner, Bernhard "Compact Wide Scan-Angle Antennas for Automotive Applications and RF MEMS Switchable Frequency-Selective Surfaces" 2014.

Yuan et al. "Multiband Printed and Double-Sided Dipole Antenna for Wlan/WiMax Applications" Microwave and Optical Technology Letters, vol. 42, No. 4, pp. 1019-1022, Apr. 2012.

* cited by examiner

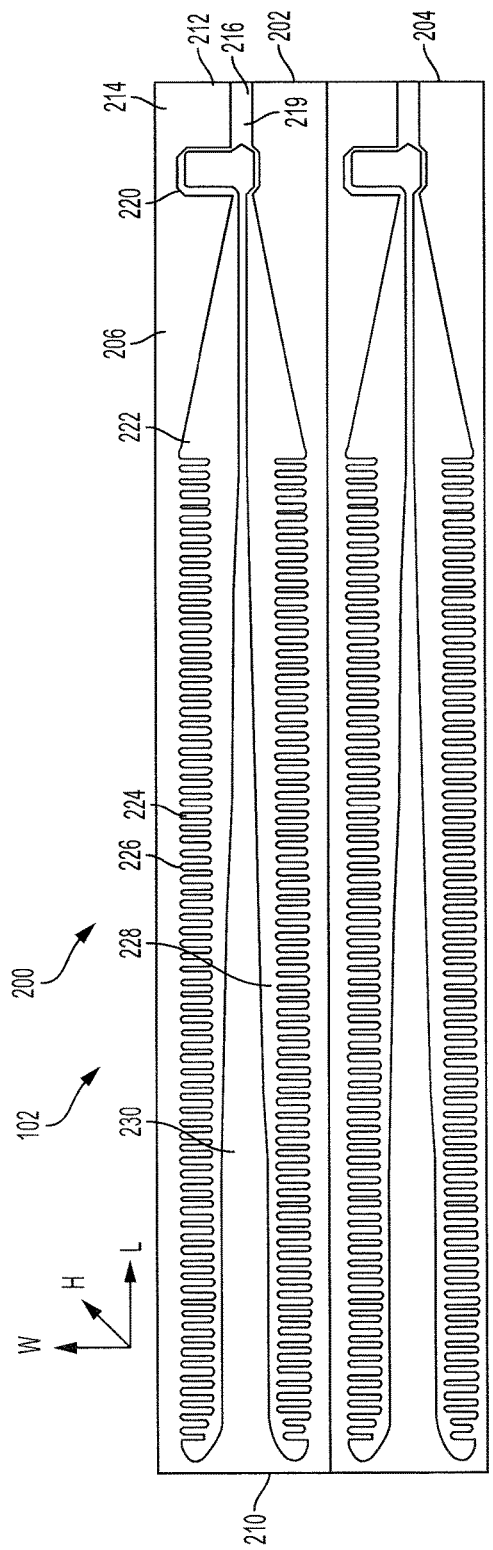
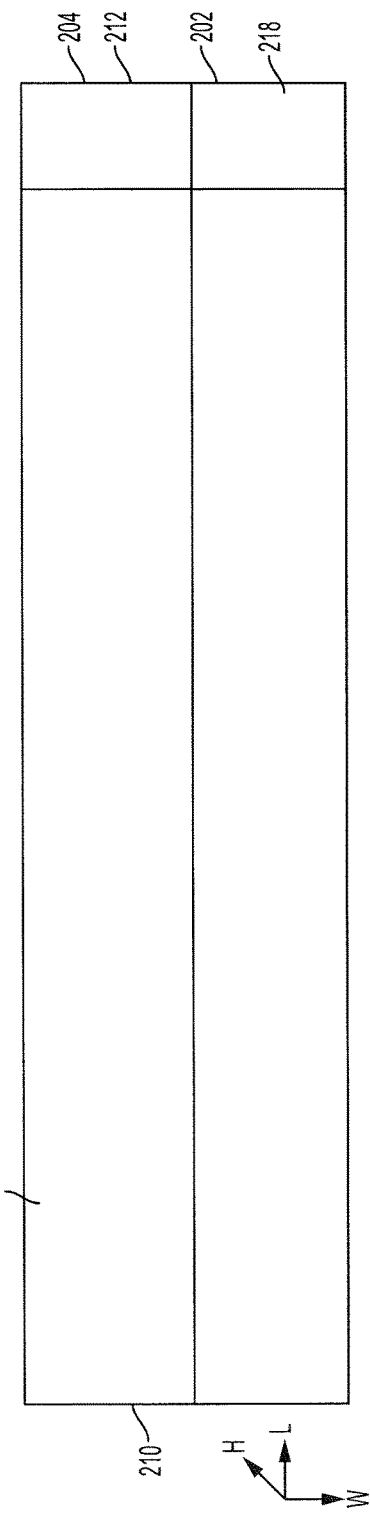
FIG. 2A
FIG. 2B

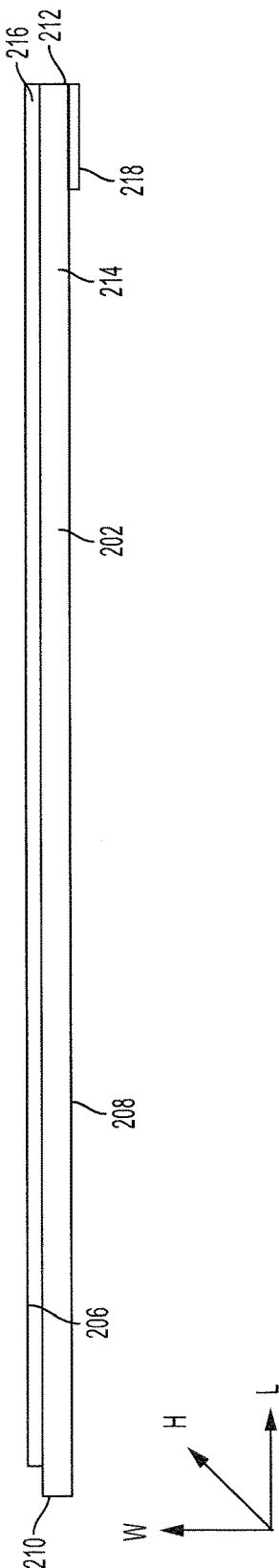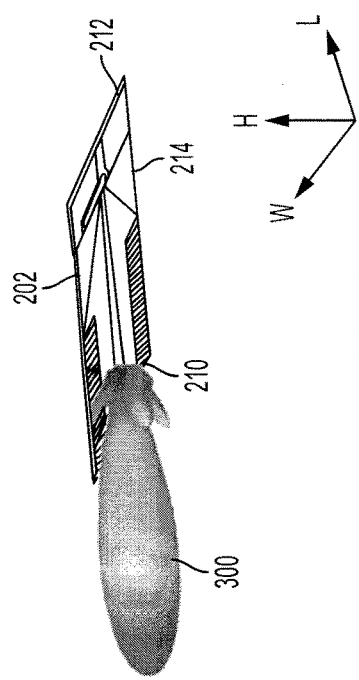
FIG. 2C
FIG. 3

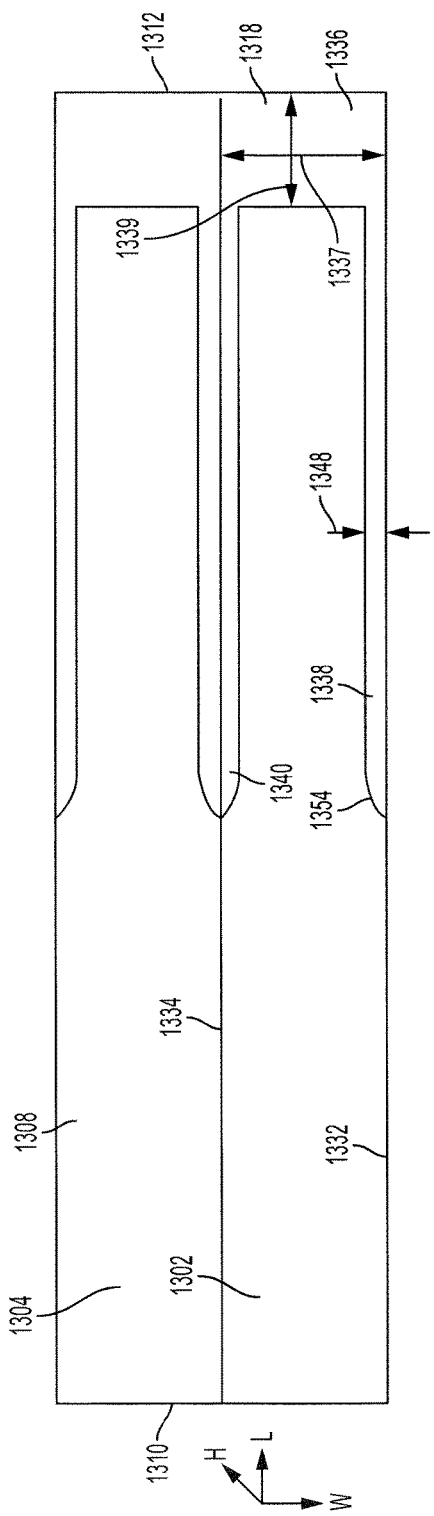
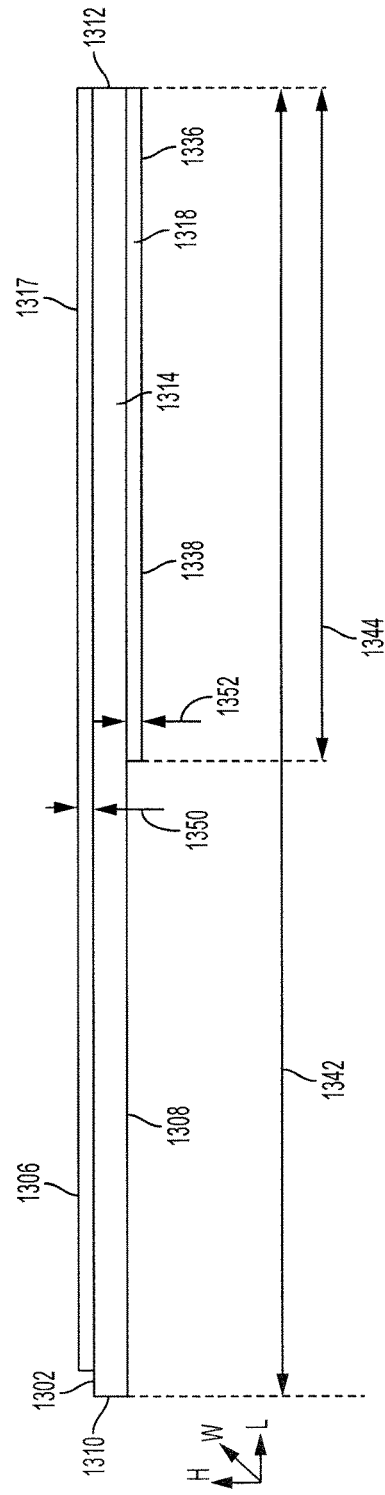
FIG. 13B
FIG. 13C

GRID BRACKET STRUCTURE FOR MM-WAVE END-FIRE ANTENNA ARRAY

BACKGROUND

1. Field

The present disclosure relates to vehicular radar systems and, in particular, to a grid structure for supporting an array of end-fire antennas without significant interference with signals transmitted by the array of end-fire antennas.

2. Description of the Related Art

Autonomous and semi-autonomous vehicle functions are increasing in popularity. For example, some vehicle manufacturers are currently designing fully autonomous and semi-autonomous vehicles that can drive themselves from a starting location to a destination location. Some other vehicles include collision avoidance features that may warn a driver and/or control operations of a vehicle when detected data indicates that the vehicle may collide with another object. Algorithms for these autonomous and semi-autonomous vehicle features are based on detection of objects in the vicinity of the vehicle, such as street signs, other vehicles, people, and the like.

Many vehicles incorporate radar systems to detect such objects. Vehicular radar systems transmit a radar signal having a frequency of about 80 gigahertz (GHz) through the air. The radar signal is reflected from a target and the reflected signals or waves are then received by the vehicular radar system. The characteristics of the reflected signals are analyzed by a processor or a controller to determine characteristics of the objects that reflected the signal, such as a size of the object, a distance between the object and the vehicle, or the like.

Conventional vehicular radar systems utilize an array of broadside antennas typically printed on a printed circuit board (PCB). Signals transmitted by these broadside antennas propagate in a direction perpendicular to a plane of the PCB. This layout provides for two-dimensional scanning in the direction perpendicular to the plane of the PCB.

Challenges arise, however, when attempting to stack broadside antennas on top of each other. In particular, difficulties arise when attempting to electrically connect an antenna controller to each broadside antenna of stacked arrays of broadside antennas. In order to electrically connect the antenna controller to each broadside antenna, a relatively large area is required for the antennas and connections. This large required area precludes stacked arrays of broadside antennas from having a compact size that is suitable for consumer vehicle use.

Another challenge with stacking broadside antennas is signal interference. For example, a first broadside antenna may be stacked above a second broadside antenna. Because the second broadside antenna transmits a signal in the direction perpendicular to the plane of the PCB, the signal is directed towards the first broadside antenna. The first broadside antenna interferes with the signal from the second broadside antenna, presenting difficulties when processing the signals.

Thus, there is a need for a structural support system and a method for structurally supporting antennas usable for volumetric scanning by vehicular radar systems.

SUMMARY

Described herein is a structurally supported millimeter-wave end-fire antenna system for use in vehicular radar systems. The millimeter-wave end-fire antenna system includes a first longitudinal rib having a width, a height that is greater than the width, and a length that is greater than the height. The first longitudinal rib defines a first longitudinal slot extending for a portion of the length of the first longitudinal rib. The first longitudinal rib has a transmission end and a chip connection end. The millimeter-wave end-fire antenna system also includes a second longitudinal rib parallel to the first longitudinal rib. The second longitudinal rib has a width, a height that is greater than the width, and a length that is greater than the height. The second longitudinal rib defines a second longitudinal slot extending for a portion of the length of the first longitudinal rib. The second longitudinal rib has a transmission end and a chip connection end. The millimeter-wave end-fire antenna system also includes a longitudinal crossbeam coupled to the first longitudinal rib and the second longitudinal rib. The longitudinal crossbeam extends in a direction perpendicular to the first longitudinal rib and the second longitudinal rib. The millimeter-wave end-fire antenna system also includes a first end-fire antenna having a height that is less than the height of the first longitudinal rib, a transmission end that is received by the first longitudinal slot such that the transmission end of the first longitudinal rib extends beyond the transmission end of the first end-fire antenna, and a chip connection end that extends beyond the chip connection end of the first longitudinal rib. The first end-fire antenna is designed to transmit a first signal having a first phase. The millimeter-wave end-fire antenna system also includes a second end-fire antenna having a height that is less than the height of the first longitudinal rib, a transmission end that is received by the second longitudinal slot such that the transmission end of the second longitudinal rib extends beyond the transmission end of the second end-fire antenna, and a chip connection end that extends beyond the chip connection end of the second longitudinal rib. The second end-fire antenna is designed to transmit a second signal having a second phase that is different than the first phase.

Also described is another structurally supported millimeter-wave end-fire antenna system for use in vehicular radar systems. The millimeter-wave end-fire antenna system includes a first end-fire antenna having a top and a bottom and that is designed to transmit a first signal having a first phase. The millimeter-wave end-fire antenna system also includes a second end-fire antenna having a top and a bottom and that is designed to transmit a second signal having a second phase. The millimeter-wave end-fire antenna system also includes a first longitudinal rib having a first slat positioned on the top of the first end-fire antenna and a second slat positioned on the bottom of the first end-fire antenna. The first end-fire antenna is sandwiched between the first slat and the second slat of the first longitudinal rib. The millimeter-wave end-fire antenna system also includes a second longitudinal rib having a first slat positioned on the top of the second end-fire antenna and a second slat positioned on the bottom of the second end-fire antenna. The second end-fire antenna is sandwiched between the first slat and the second slat of the second longitudinal rib. The millimeter-wave end-fire antenna system also includes a crossbeam coupled to the first longitudinal rib and the second longitudinal rib and extends in a direction perpendicular to the first longitudinal rib and the second longitudinal rib.

Also described is a tapered-slot end-fire antenna having a finger ground structure for providing increased rigidness. The tapered-slot end-fire antenna includes a printed circuit board (PCB) having a top surface, a bottom surface, a chip connection end, a transmission end, and a first outer edge extending from the chip connection end to the transmission end. The tapered-slot end-fire antenna also includes metal coupled to the PCB. The metal forms an antenna structure on the top surface of the PCB. The metal also forms a ground connection on the bottom surface of the PCB. The ground connection includes a main ground section extending from the chip connection end of the PCB towards the transmission end of the PCB. The ground connection also includes a finger having a smaller width than the main ground section. The finger is positioned adjacent the first outer edge and extends from the main ground section towards the transmission end of the PCB.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIG. 2A is a drawing showing a top view of two end-fire antennas of an end-fire antenna array according to an embodiment of the present invention;

FIG. 2B is a drawing showing a bottom view of the end-fire antenna array of FIG. 2A according to an embodiment of the present invention;

FIG. 2C is a drawing showing a side view of the end-fire antenna array of FIG. 2A according to an embodiment of the present invention;

FIG. 3 is a drawing illustrating a shape of a radar beam transmitted by one of the end-fire antennas of FIG. 2A according to an embodiment of the present invention;

FIG. 13B is a drawing showing a bottom view of the tapered-slot end-fire antenna array of FIG. 13A according to an embodiment of the present invention;

FIG. 13C is a drawing showing a side view of the tapered-slot end-fire antenna array of FIG. 13A according to an embodiment of the present invention.

DETAILED DESCRIPTION

Disclosed herein are bracket structures that structurally support and enhance the performance of tapered-slot end-fire antennas, allowing the antennas to be used in vehicular radar systems. The bracket structure includes ribs and cross-beams arranged and stacked perpendicular to one another to form a matrix-type structure. Thin tapered-slot end-fire antennas are positioned in the bracket structure and are controlled to transmit signals in a longitudinal or a parallel direction. The bracket structure allows for the end-fire antennas to be securely held in place and to be stacked on top of each other, allowing for the end-fire antennas to produce a volumetric (three-dimensional) scan of the surrounding environment. The bracket structure also structurally supports the thin antennas, reducing the likelihood of damage or deformation of the antennas. These bracket structures and tapered-slot end-fire antennas can be used in most vehicles including autonomous and semi-autonomous vehicles.

The vehicular radar systems provide several benefits and advantages. For example, because an array of tapered-slot end-fire antennas is relatively thin and thus susceptible to deformation, the longitudinal ribs and the one or more crossbeams provide the benefit and advantage of structurally supporting the antenna array. This structural support reduces the likelihood of damage or deformation of the antenna array. The metal on the underside of each antenna provides benefits and advantages such as providing additional structural support and reducing interference between adjacent antennas. The ribs have an ellipsoid shape that provides the benefit and advantage of focusing the signal transmitted by the corresponding end-fire antenna in a desired direction. The crossbeams provide the benefit and advantage of allowing multiple antennas to be stacked above each other, providing the benefit and advantage of allowing the multiple antennas to transmit a three-dimensional radar beam.

Figure 1:
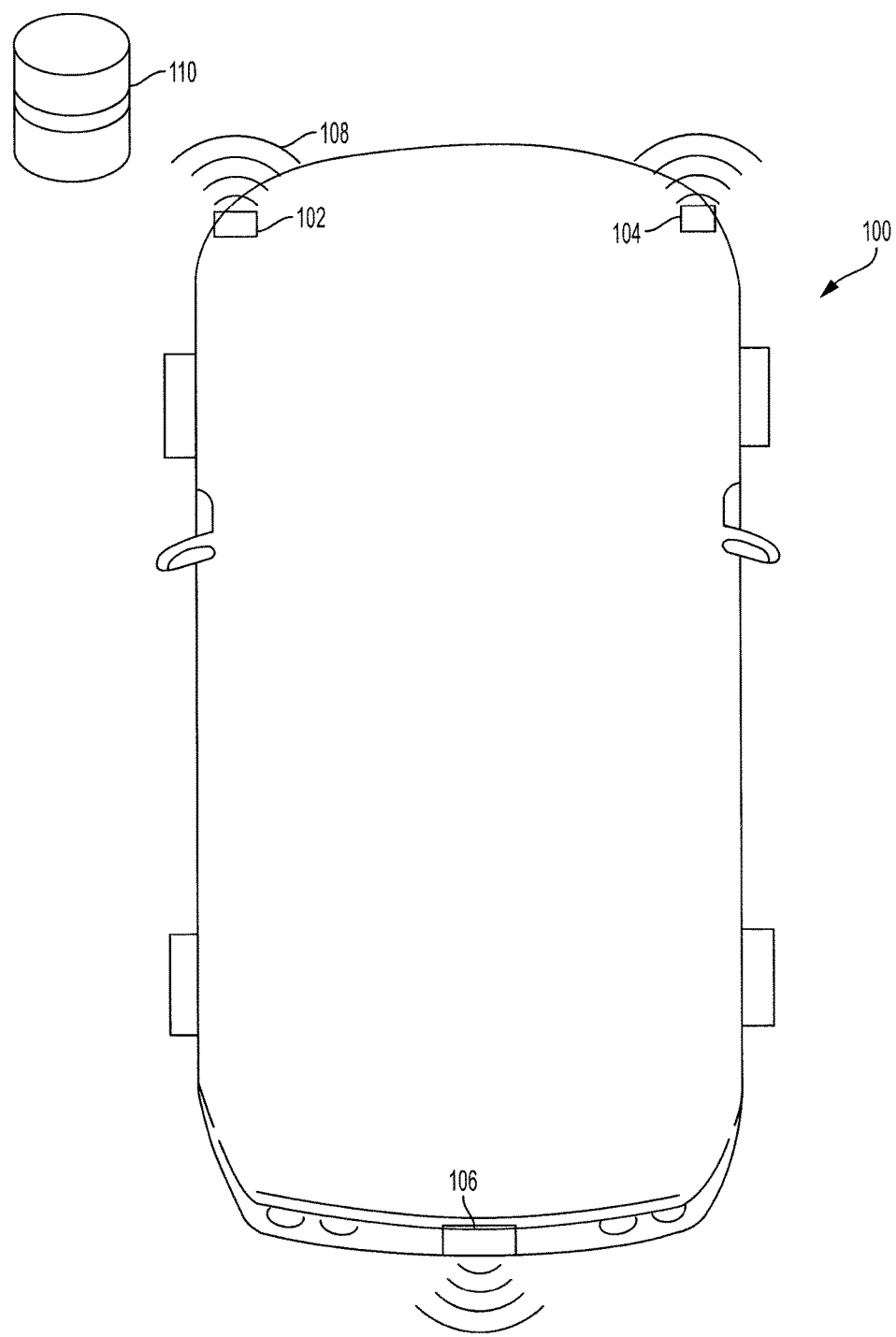
FIG. 1 is a drawing of a vehicle having multiple vehicular radar systems for sensing objects in an environment of the vehicle according to an embodiment of the present invention.

Turning to FIG. 1, a vehicle 100 having radar sensing capabilities is shown. The vehicle 100 includes a first vehicular radar system 102, a second vehicular radar system 104, and a third vehicular radar system 106. Each of the vehicular radar systems 102, 104, 106 may determine the location and characteristics of objects around the vehicle 100. For example, the vehicular radar system 102 may transmit a signal 108. The signal 108 may reflect off of an object 110 and propagate back towards the vehicular radar system 102. The vehicular radar system 102 may receive the reflected signal and determine a location and characteristics of the object 110 based on the received reflected signal.

Turning to FIGS. 2A, 2B, and 2C, a top view, a bottom view, and a side view, respectively, of an end-fire antenna array 200 are shown. The end-fire antenna array 200 may be included in the vehicular radar system 102. An L-W-H axis is shown in various drawings to illustrate directions corresponding to a length, a width, and a height of the vehicular radar system 102. Although features are described with reference to the length, the width, and the height, one skilled in the art will realize that the vehicular radar system 102 may be oriented in any direction such that, for example, a height may be referred to as a length and so forth.

The end-fire antenna array 200 has a plurality of end-fire antennas including a first end-fire antenna 202 and a second end-fire antenna 204. In some embodiments, the antenna array 200 may include between 2 and 32 antennas.

The antenna array 200, and thus the first antenna 202 and the second antenna 204, has a top 206 and a bottom 208. The terms top and bottom are used for reference only. One skilled in the art will realize that the top 206 and the bottom 208 of the antenna array 200 may be oriented in any direction.

The antenna array 200 also includes a transmission end 210 and a chip connection end 212. A signal from an antenna controller (such as the antenna controller 906 of FIG. 9A) may be received by the first antenna 202 at the chip connection end 212. The signal may propagate through the first antenna 202 towards the transmission end 210. From the transmission end, the signal may be wirelessly transmitted in the longitudinal direction (i.e., in the negative L direction). Similarly, a wireless signal (such as a signal reflected off of an object) may be received by the first antenna 202 at the transmission end 210 and may propagate through the first antenna 202 to the chip connection end 212. The signal may then be received by the antenna controller and analyzed by the antenna controller to determine features of the object from which it was reflected.

The first antenna 202 may include a metal 216 printed on a PCB 214. The metal 216 on the bottom 208 of the first antenna 202 may form a ground connection 218. The ground connection 218 may be isolated from the metal 216 on the top 206 of the first antenna 202 and may be connected to an electrical ground.

The metal 216 on the top 206 of the first antenna 202 may form a chip connection lead 219, a balun 220, a tapered section 222, and a wave section 224. The chip connection lead 219 may be electronically connected to an antenna controller (such as the antenna controller 906 of FIG. 9A) that controls operation of the antenna array 200. This layout may be referred to as a tapered-slot end-fire antenna.

The balun 220 may function as a transformer and convert an unbalanced signal to a balanced signal and/or may convert a balanced signal to an unbalanced signal.

The tapered section 222 is tapered from the wave section 224 to the balun 220. The converted signal may propagate through the tapered section 222 towards the wave section 224.

The wave section 224 may include a first wave section 226 and a second wave section 228 separated by a space 230. The design of the wave section 224 allows the signal propagating towards the transmission end 210 to continue to propagate beyond the wave section 224 in a wireless manner.

Turning to FIG. 3, the first antenna 202 functions as an end-fire antenna because it transmits a signal 300 that propagates in a direction parallel to a longitudinal direction of the first antenna 202. This is distinguished from a signal transmitted by a broadside antenna that propagates perpendicular to a longitudinal direction of an antenna (i.e., in the positive H direction).

Returning reference to FIGS. 2A, 2B, and 2C, bandwidths for automotive radar systems may be about 80 gigahertz (GHz), such as between 77 GHz and 79 GHz. Where used in this context, "about" refers to the referenced value plus or minus seven percent (7%). The end-fire antennas provide desirable characteristics at these bandwidths. The end-fire antennas may be positioned adjacent to each other, as shown in FIG. 2A, in order to form a beam that scans in two dimensions. Furthermore, because the signal propagates away from the antenna in the longitudinal direction, the end-fire antennas may be stacked on top of each other, allowing for a volumetric (three-dimensional) scan.

In order to obtain desirable antenna properties of signals having bandwidths in the automotive spectrum, the substrate of the antenna array 200 (i.e., the PCB 214) should be relatively thin. For example, the antenna 202 (including the PCB 214) may have a height of 0.127 mm in the H direction, a width of 2.5 mm in the W direction, and a length of 10 mm to 30 mm in the L direction. In that regard, the antenna array 200 may have a relatively low rigidity and may bend or break with relative ease. Furthermore, signals from the antenna array 200 may be undesirably distorted or otherwise affected when placed in conventional metal or plastic structures used in other antenna systems.

Figure 4:
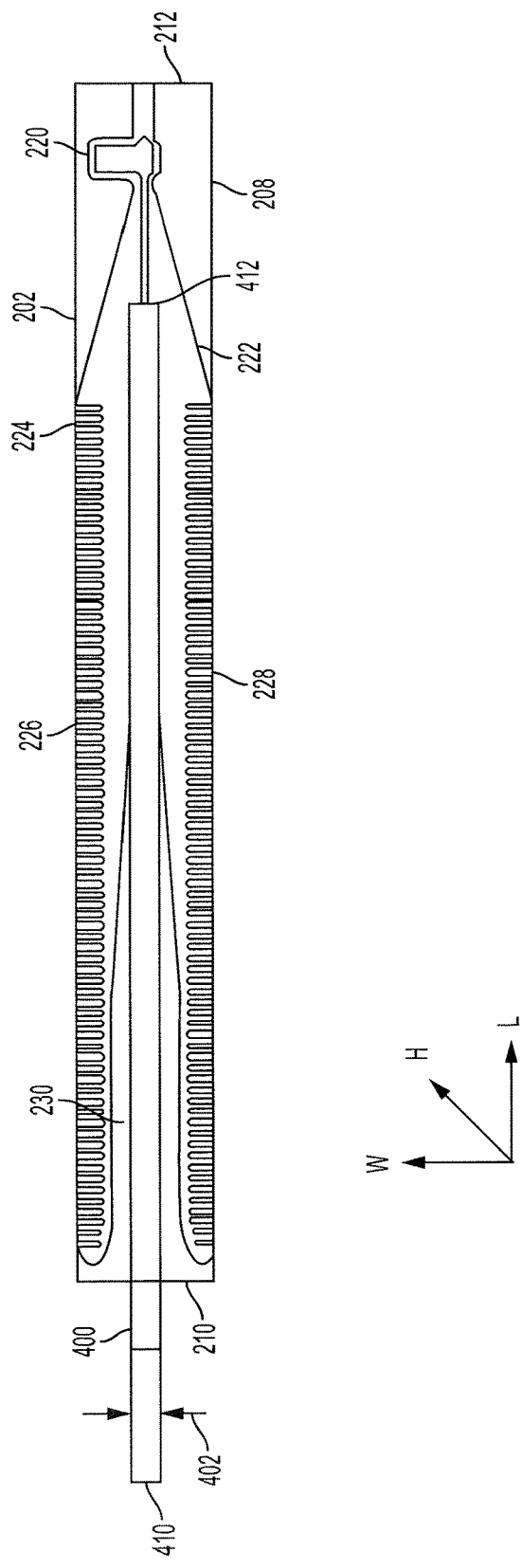
FIG. 4 is a drawing showing a longitudinal rib coupled to one of the end-fire antennas of FIG. 2A according to an embodiment of the present invention.

Turning to FIG. 4, in order to provide rigidity to an end-fire antenna, a rib may be coupled to the antenna. In particular, a longitudinal rib 400 may be coupled to or positioned about the antenna 202. The longitudinal rib 400 may extend for a distance beyond the top 206 of the antenna 202 and for a distance beyond the bottom 208 of the antenna 202 (i.e., in the positive H and negative H directions). The longitudinal rib 400 may include a rib, a beam, a bar, or other elongated structure.

The longitudinal rib 400 may be positioned in the space 230 between the first wave section 226 and the second wave section 228. The longitudinal rib 400 may overlap with the tapered metal of the wave section 224 at locations proximate to the chip connection end 212 of the antenna 202. However, it may be undesirable for the longitudinal rib 400 to overlap with the waves defined by the wave section 224.

The longitudinal rib 400 may have a transmission end 410 that extends beyond the transmission end 210 of the antenna 202 in the negative L direction. The longitudinal rib 400 may also have a chip connection end 412 that does not reach the chip connection end 212 of the antenna 202. That is, the chip connection end 212 of the antenna 202 may extend beyond the chip connection end 412 of the longitudinal rib 400 in the L direction.

The chip connection end 412 of the longitudinal rib 400 may terminate at any location between the wave section 224 and the balun 220. For example, the chip connection end 412 of the longitudinal rib 400 may extend for between thirty percent (30%) and seventy percent (70%) of the distance of the tapered section 222 in the L direction, may extend for between forty percent (40%) and sixty percent (60%) of the distance of the tapered section 222 in the L direction, or may extend for about fifty percent (50%) of the distance of the tapered section 222 in the L direction. Where used in this context, about refers to the referenced value plus or minus seven percent (7%) of the referenced value.

In some embodiments, the longitudinal rib 400 may not overlap with the tapered section 222 and may thus terminate at a location along the wave section 224.

The longitudinal rib 400 may have a width 402 in the W direction. As described above, the antenna 202 may transmit a signal. It is desirable for the width 402 to be equal to or less than a quarter of a size of the wavelength of the signal transmitted by the antenna 202. When the width 402 is less than a quarter of a size of the wavelength, any effect of the longitudinal rib 400 on the signal transmitted by the antenna 202 is minimized.

As described above, the frequency of the signal may be approximately 80 GHz. 80 GHz corresponds to a wavelength of about 3.3 millimeters (3.3 mm). Because the wavelength is measured in millimeters, the antenna 202 may be referred to as a millimeter-wave antenna. In some embodiments, it is desirable for the width 402 of the longitudinal rib 400 to be less than or equal to 0.825 mm, which corresponds to a quarter of the size of the 3.3 mm wavelength.

Figure 5A:
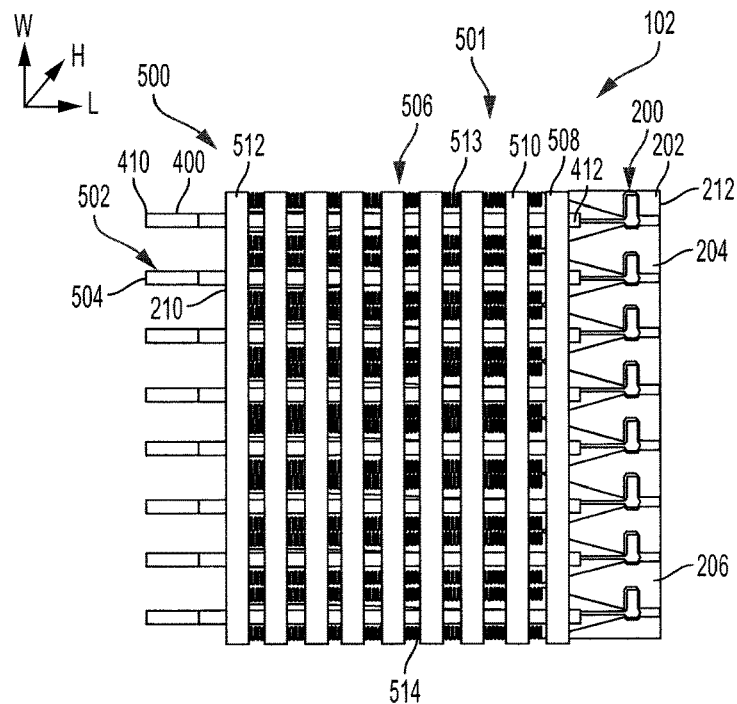
FIG. 5A is a drawing showing a top view of an end-fire antenna system of one of the vehicular radar systems of FIG. 1 having a radar mount that includes a grid structure and includes the antenna array of FIG. 2A according to an embodiment of the present invention.
Figure 5B:
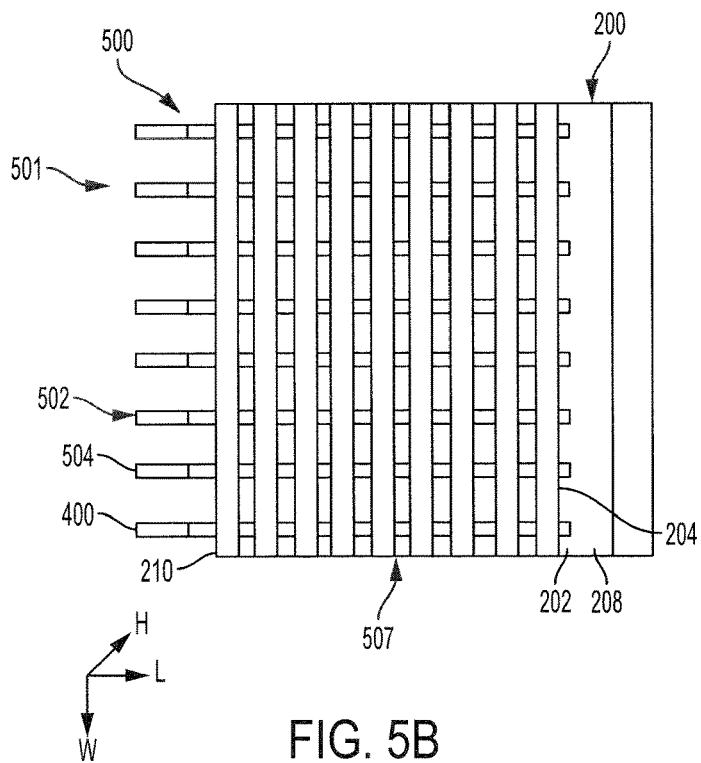
FIG. 5B is a drawing showing a bottom view of the end-fire antenna system of FIG. 5A according to an embodiment of the present invention.

Turning to FIGS. 5A and 5B, a top view and a bottom view, respectively, of the vehicular radar system 102 illustrate features of a structurally supported millimeter-wave end-fire antenna system 501 of the vehicular radar system 102. The end-fire antenna system 501 may include the antenna array 200 having a plurality of antennas including the first end-fire antenna 202 and the second end-fire antenna 204.

The end-fire antenna system 501 may also include a radar mount 500 having a plurality of ribs 502 including the first rib 400 and a second rib 504. The radar mount 500 may also include a plurality of crossbeams 506 including a first crossbeam 508, a second crossbeam 510, and a last crossbeam 512, above the top 206 of the antenna array 200. The radar mount 500 may also include a plurality of crossbeams 507 below the bottom 208 of the antenna array 200. The crossbeams 506, 507 increase structural support of the radar mount 500. Because the width of the ribs 502 is limited, it is desirable to use at least one crossbeam 506, 507 coupled to two or more ribs 502 to increase structural support for the antenna array 200. The ribs 502 and the crossbeams 506, 507 work together to resist flexing or breaking of the antenna array 200.

One of the plurality of ribs 502 may be aligned with each antenna of the antenna array 200. For example, the first rib 400 is aligned with the first antenna 202 and the second rib 504 is aligned with the second antenna 204.

Each of the plurality of crossbeams 506 may be substantially perpendicular to each of the plurality of ribs 502 (i.e., each of the plurality of crossbeams 506 may form an angle with each of the plurality of ribs 502 that is between 70 degrees and 110 degrees). Each of the crossbeams 506 may extend across two or more of the plurality of ribs 502. In some embodiments, each of the crossbeams 506 may extend across each of the plurality of ribs 502. In some embodiments, each of the crossbeams 506 may extend from a first side edge 513 of the antenna array 200 to a second side edge 514 of the antenna array 200. In some embodiments, each of the crossbeams 506 may extend beyond the first side edge 513 and the second side edge 514. In some embodiments, the radar mount 500 may include only one crossbeam. A width of the crossbeams 506 is not limited, so a relatively wide crossbeam can be included in the radar mount 500.

In some embodiments, the first crossbeam 508 may be positioned at a location towards the transmission end 410 of the first rib 400 from the chip connection end 412 of the first rib 400 or may be aligned with the transmission end 410 of the first rib 400. That is, the first crossbeam 508 may be aligned with the transmission end 410 of the first rib 400 in the L direction or may be positioned a distance in the negative L direction from the transmission end 410 of the first rib 400.

In some embodiments, the last crossbeam 512 may be aligned with the transmission end 210 of the first antenna or may be positioned at a location towards the chip connection end 212 from the transmission end 210. In some embodiments, the radar mount 500 may include any number of crossbeams 506. For example, the radar mount 500 may include only one crossbeam, may include the same number of crossbeams 506 as ribs 502, may include more crossbeams 506 than ribs 502, or may include less crossbeams 506 than ribs 502.

Figure 6:
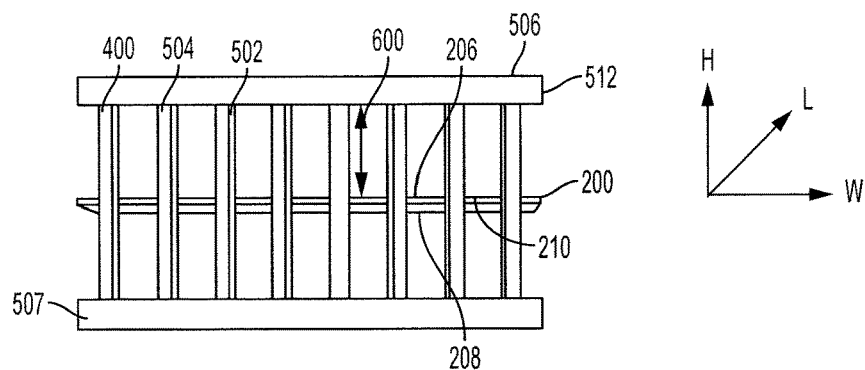
FIG. 6 is a drawing of a front view of the end-fire antenna system of FIG. 5A according to an embodiment of the present invention.

Turning now to FIG. 6, a view of the end-fire antenna system 501 from the transmission end 410 of the plurality of ribs 502 (i.e., along the L axis) is shown. Each of the plurality of ribs 502 may be substantially parallel to each of the other ribs. That is, each of the plurality of ribs 502 may form an angle between −5 degrees and 5 degrees with each of the other ribs of the plurality of ribs 502.

Each of the plurality of ribs 502 may be substantially perpendicular to a plane defined by the antenna array 200. That is, each of the plurality of ribs 502 may form an angle with the plane defined by the antenna array 200 that is between 85 degrees and 95 degrees. In that regard, each of the plurality of ribs 502 may have a height 600 extending away from the top 206 of the antenna array 200 in the H direction. In some embodiments, it may be desirable for the height 600 to be at least two times the value of the wavelength transmitted by each antenna of the antenna array 200. As stated above, the wavelength may be about 3.3 mm and, thus, it may be desirable for the height 600 to be at least 6.6 mm. Each of the plurality of ribs 502 may extend away from the bottom 208 of the antenna array 200 by the same distance that is at least two times the value of the wavelength transmitted by each antenna of the antenna array 200.

As shown, each of the crossbeams 506, including the last crossbeam 512, may be coupled to the outer edges of each of the plurality of ribs 502. In that regard, each of the crossbeams 506 may be spaced apart from the antenna array 200 by the height 600 of the ribs 502. Each of the crossbeams 506 may be substantially parallel to each of the crossbeams 507 and to each antenna of the antenna array 200. That is, each of the crossbeams 506 may form an angle with each of the crossbeams 507 and/or each antenna of the antenna array 200 that is between −5 degrees and 5 degrees.

Figure 7:
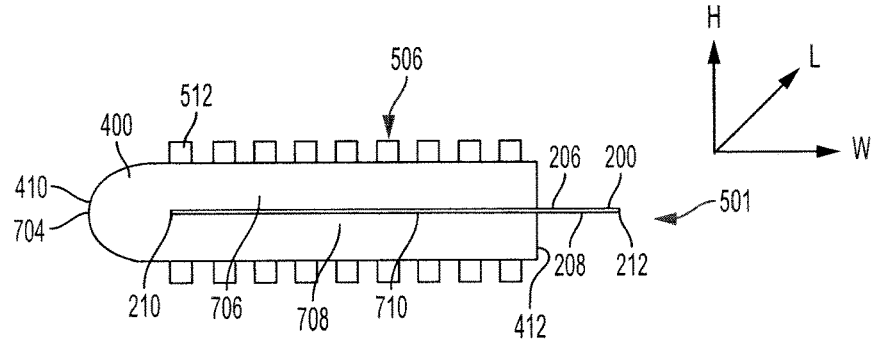
FIG. 7 is a drawing of a side view of the end-fire antenna system of FIG. 5A that illustrates an ellipsoid shape at a transmission end of a longitudinal beam according to an embodiment of the present invention.

Turning now to FIG. 7, a side view of the end-fire antenna system 501 (i.e., along the W axis) illustrates a cross-section of the first rib 400. As shown, the transmission end 410 of the first rib 400 may have an ellipsoid shape. The curve of the ellipsoid may begin at a location in the negative L direction from the transmission end 210 of the antenna array 200 and/or at a location in the negative W direction from the last crossbeam 512. The ellipsoid may have a vertex 704 that extends away from the antenna array 200 in the negative W direction. In some embodiments, the transmission end 410 of the ribs 502 may have a shape other than an ellipsoid. In some embodiments, the transmission end 410 of the ribs 502 may not extend beyond the transmission end 210 of the antenna array 200, or may extend for only a fraction of the distance shown in FIG. 8. For example, the transmission end 410 of the ribs 502 may extend for between 5 millimeters and 15 centimeters beyond the transmission end 210 of the antenna array 200, or may extend for between 5 millimeters and 10 centimeters beyond the transmission end 210 of the antenna array. The gain of the antenna array 200 may increase as the transmission end 410 of the ribs 502 approaches 15 centimeters.

The first rib 400 may define a longitudinal slot 710 extending from the chip connection end 412 in the longitudinal direction (i.e., in the negative L direction) through a center of the first rib 400 towards the transmission end 410. The longitudinal slot 710 may receive the antenna array 200. In some embodiments, the first rib 400 may be in contact with and/or coupled to the antenna array 200. For example, the first rib 400 may exert a force on the antenna array 200 in the positive H and negative H directions, the force resisting separation of the antenna array 200 from the first rib 400. In some embodiments, friction between the first rib 400 and the antenna array 200 may resist separation of the antenna array 200 from the first rib 400. In some embodiments, the first rib 400 may not resist separation from the antenna array 200.

The first rib 400 may include a first slat 706 and a second slat 708. The first slat 706 may be regarded as the portion of the first rib 400 above the top 206 of the antenna array 200 and the second slat 708 may be regarded as the portion of the first rib 400 below the bottom 208 of the antenna array 200. In some embodiments, the first rib 400 may be formed by assembling the first slat 706 and the second slat 708 separately and then coupling the first slat 706 to the second slat 708. For example, the first slat 706 may be coupled to the second slat 708 via an adhesive, a mechanical connector such as a screw or a rivet, or any other method. In some embodiments, the first rib 400 may be integrally formed (i.e., formed from a single continuous piece of material) with the longitudinal slot 710 being formed concurrently or at a later time.

Figure 8:
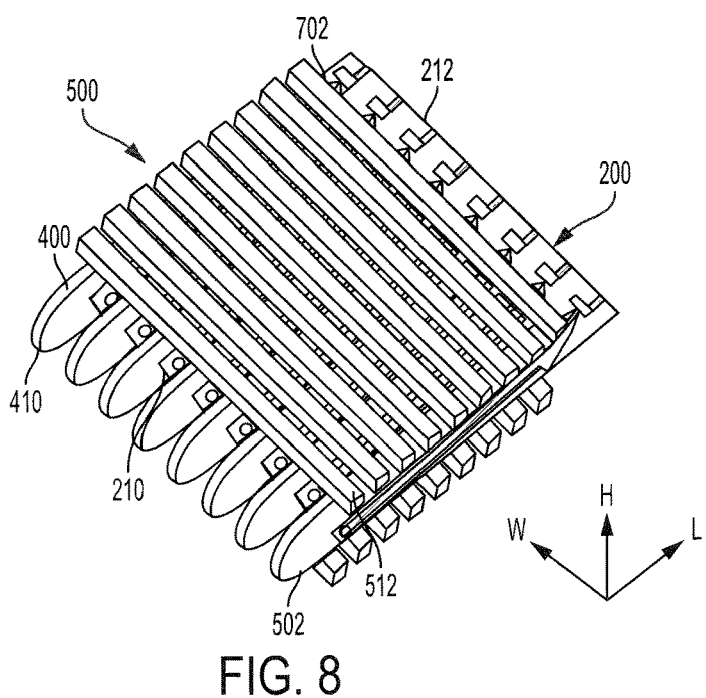
FIG. 8 is a drawing showing a perspective view of the end-fire antenna system of FIG. 5A according to an embodiment of the present invention.

Turning to FIG. 8, a perspective view of the end-fire antenna system 501 including the radar mount 500 and the antenna array 200 is shown. The material of the radar mount 500 may include a plastic, a resin, or another compound. The material of the radar mount 500 may have a loss tangent that is less than 0.02 or less than 0.01. Similarly, the material of the radar mount 500 may have a dielectric constant (i.e., an epsilon permittivity) below 3, such as between 1 and 3. For example, the material of the radar mount 500 may include ABS-30M, available from Stratasys of Eden Prairie, Minn., or ULTEM1010, also available from Stratasys of Eden Prairie, Minn.

The radar mount 500 may be formed using various methods. For example, the radar mount 500 may be created using additive manufacturing (such as 3-D printing), injection molding, or other forming methods appropriate for the specific material used.

FIG. 8 illustrates that each of the plurality of ribs 502 has an ellipsoid shape at the transmission end 410. Because the material of the plurality of ribs 502 has an epsilon permittivity that is greater than one, the transmission end 410 of the plurality of ribs 502 may affect the signal transmitted from the transmission end 210 of each of the antennas of the antenna array 200. In particular, the ellipsoid shape of each of the plurality of ribs 502 may focus the signal transmitted by each antenna of the antenna array 200 in a desired direction, such as in the negative L direction, assisting in forming the beam transmitted by the antenna array 200.

Figure 9A:
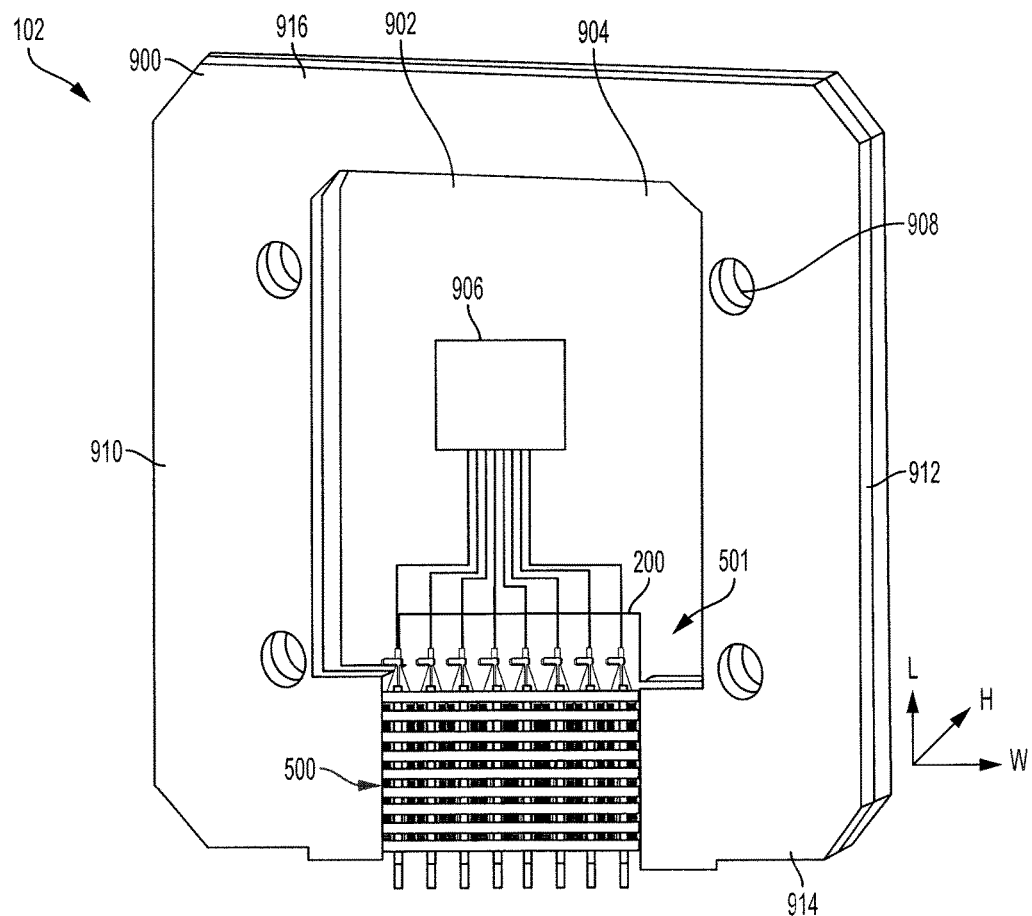
FIG. 9A is a drawing showing a top view of one of the vehicular radar systems of FIG. 1 including a frame and a chip printed circuit board along with a radar mount and an antenna array according to an embodiment of the present invention.
Figure 9B:
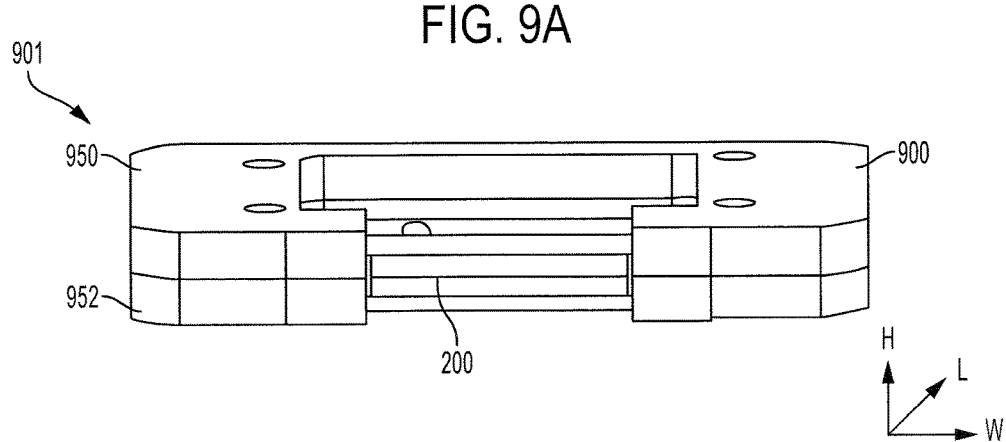
FIG. 9B is a drawing showing front view of the vehicular radar system of FIG. 9A according to an embodiment of the present invention.

Turning now to FIGS. 9A and 9B, the vehicular radar system 102 may include a frame 900, a chip PCB 904, and the end-fire antenna system 501. As shown, the frame 900 may have a first side portion 910 and a second side portion 912 opposite the first side portion 910. The frame 900 may also have a third side portion 916 that is perpendicular to and adjacent to the first side portion 910 and the second side portion 912. The frame 900 may also have a transmission side portion 914 that is parallel to the third side portion 916 and adjacent to the first side portion 910 and the second side portion 912. The frame 900 may also include a first frame portion 950 and a second frame portion 952 that are split by a plane parallel to the L-W plane.

The first side portion 910, the second side portion 912, the third side portion 916, and the transmission side portion 914 may define an area or space 902. The chip PCB 904 may be positioned within the space 902 and coupled to the frame 900. In order to couple the chip PCB 904 to the frame 900, the chip PCB 904 may be aligned with and positioned adjacent to the first frame portion 950 or the second frame portion 952. The edges of the chip PCB 904 may overlay at least a portion of the first side portion 910, the second side portion 912, the third side portion 916, or the transmission side portion 914.

The first frame portion 950 may be aligned with the second frame portion 952 such that the chip PCB 904 is sandwiched therebetween. The first frame portion 950 may then be coupled to the second frame portion 952 via, for example, adhesives, mechanical connectors, or the like. For example, physical connectors such as screws may be inserted through one or more connector holes 908 and may couple the first frame portion 950 to the second frame portion 952. Because the chip PCB 904 is sandwiched between the first frame portion 950 and the second frame portion 952, the frame 900 will resist separation of the chip PCB 904 from the frame 900.

The antenna array 200 may be formed integral to the chip PCB 904. In that regard, the chip PCB 904 and the antenna array 200 may be assembled within the frame 900 at the same time. Likewise, the radar mount 500 may be formed integral to the frame 900. In that regard, the radar mount 500 may be coupled to the antenna array 200 during the same process of coupling the frame 900 to the chip PCB 904. Thus, the coupling of the chip PCB 904 to the frame 900 may resist separation of the antenna array 200 from the radar mount 500.

In some embodiments, the radar mount 500 may be formed separate from the frame 900. In that regard, the frame 900 may include a separate material from the radar mount 500. For example, the frame 900 may include a different plastic, metal, or other compound. In some embodiments, the radar mount 500 may or may not be coupled to the frame 900.

An antenna controller or processor 906 may be positioned on the chip PCB 904 and may be coupled to each antenna of the antenna array 200. In that regard, the antenna controller 906 may generate the signal to be transmitted by the antenna array 200, and may receive any signal received by the antenna array 200. In order to transmit a beam having desired characteristics, the antenna controller 906 may send a unique signal to each antenna of the antenna array 200. Each of the unique signals may have a different phase from one or more of the other signals. By adjusting the phase of each signal, characteristics of the beam, such as beam width or beam height, can be adjusted.

Figure 10A:
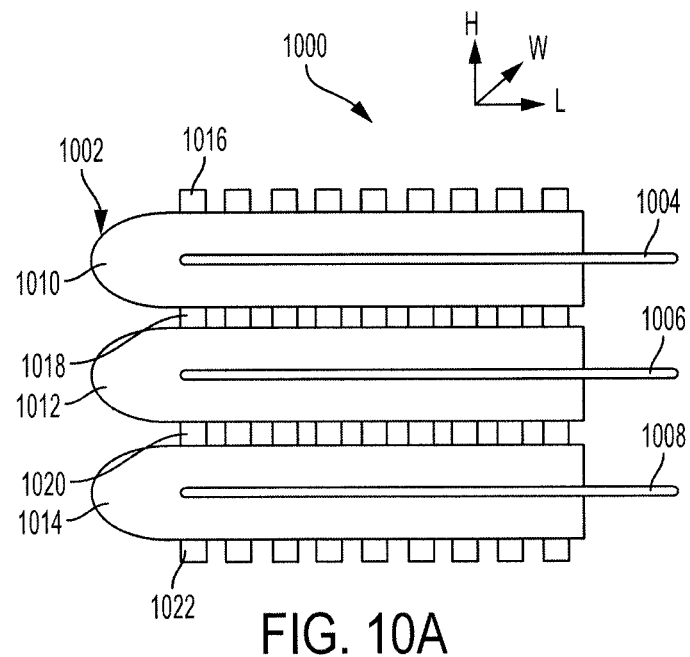
FIG. 10A is a drawing showing a side view of an end-fire antenna system having a radar mount that includes three pluralities of longitudinal ribs stacked above each other and three antenna arrays each received by one of the plurality of longitudinal ribs according to an embodiment of the present invention.
Figure 10B:
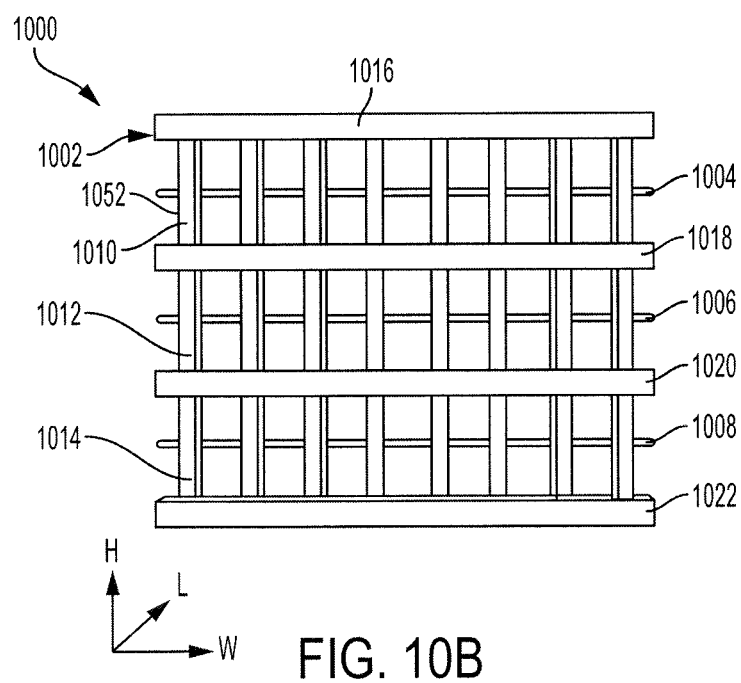
FIG. 10B is a drawing showing a front view of the end-fire antenna system of FIG. 10A according to an embodiment of the present invention.
Figure 10C:
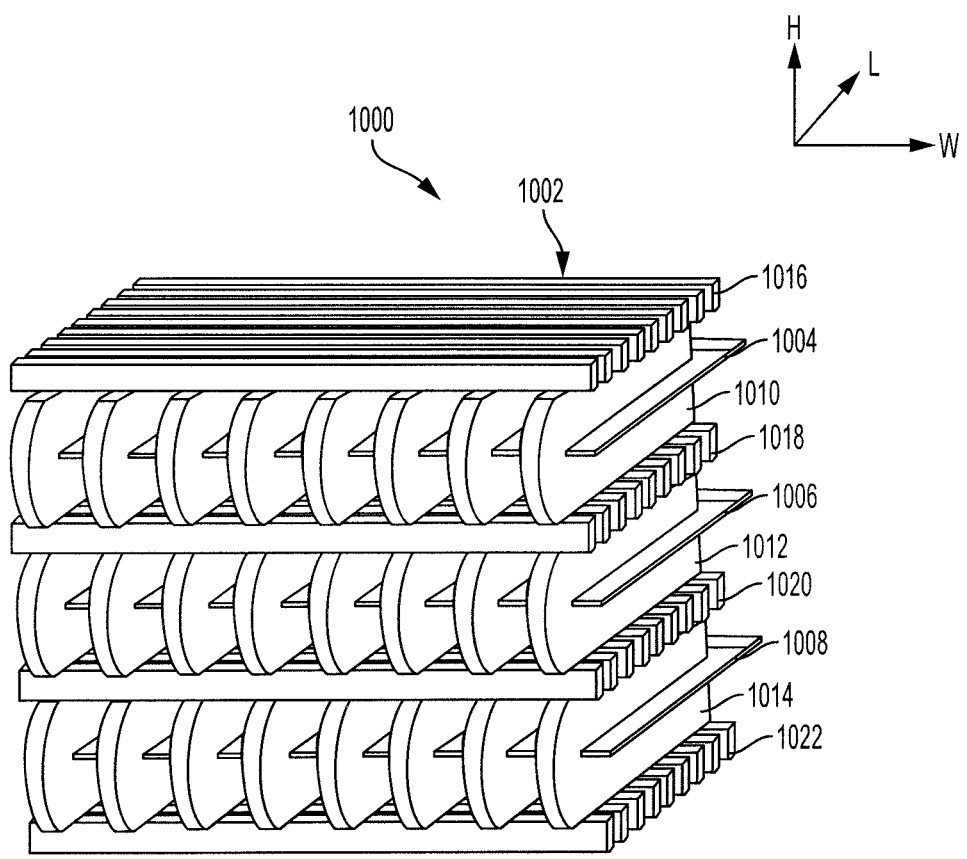
FIG. 10C is a drawing showing a perspective view of the end-fire antenna system of FIG. 10A according to an embodiment of the present invention.

Turning now to FIGS. 10A, 10B, and 10C, an end-fire antenna system 1000 may include multiple antenna arrays along with a radar mount. In particular, the end-fire antenna system 1000 includes a first antenna array 1004, a second antenna array 1006, and a third antenna array 1008, along with a radar mount 1002. The radar mount 1002 includes a first plurality of ribs 1010, a second plurality of ribs 1012, and a third plurality of ribs 1014, along with a first plurality of crossbeams 1016, a second plurality of crossbeams 1018, a third plurality of crossbeams 1020, and a fourth plurality of crossbeams 1022. This arrangement and variations thereof may be referred to as a matrix-type structure.

The first plurality of ribs 1010 is stacked above the second plurality of ribs 1012, which is stacked above the third plurality of ribs 1014. That is, the first plurality of ribs 1010 is positioned farther in the H direction than the second plurality of ribs 1012, which is positioned farther in the H direction than the third plurality of ribs 1014. The first plurality of crossbeams 1016 is positioned above the first plurality of ribs 1010, and the second plurality of crossbeams 1018 is positioned between the first plurality of ribs 1010 and the second plurality of ribs 1012 in the H direction. The third plurality of crossbeams 1020 is positioned between the second plurality of ribs 1012 and the third plurality of ribs 1014 in the H direction, and the fourth plurality of crossbeams 1022 is positioned below the third plurality of ribs 1014.

Each of the antenna arrays 1004, 1006, 1008 includes multiple antennas spaced apart along the W axis. Similarly, the first antenna array 1004, the second antenna array 1006, and the third antenna array 1008 are each spaced apart along the H axis. Because the signal from each of the antennas propagates in the negative L direction, the first antenna array 1004 does not interfere with signals transmitted by the second antenna array 1006, the second antenna array 1006 does not interfere with signals transmitted by the third antenna array 1008, and so forth. Thus, the structure of the radar mount 1002 provides a two-dimensional matrix of effective antennas that can provide a three-dimensional volumetric scan of the environment.

Broadside antennas transmit a signal in the H direction. Thus, if broadside antennas were used in a structure similar to the radar mount 1002, the antennas on a first antenna array would interfere with signals transmitted by any antennas that were below the first antenna array. Thus, use of broadside antennas in the radar mount 1002 is undesirable.

Figure 11:
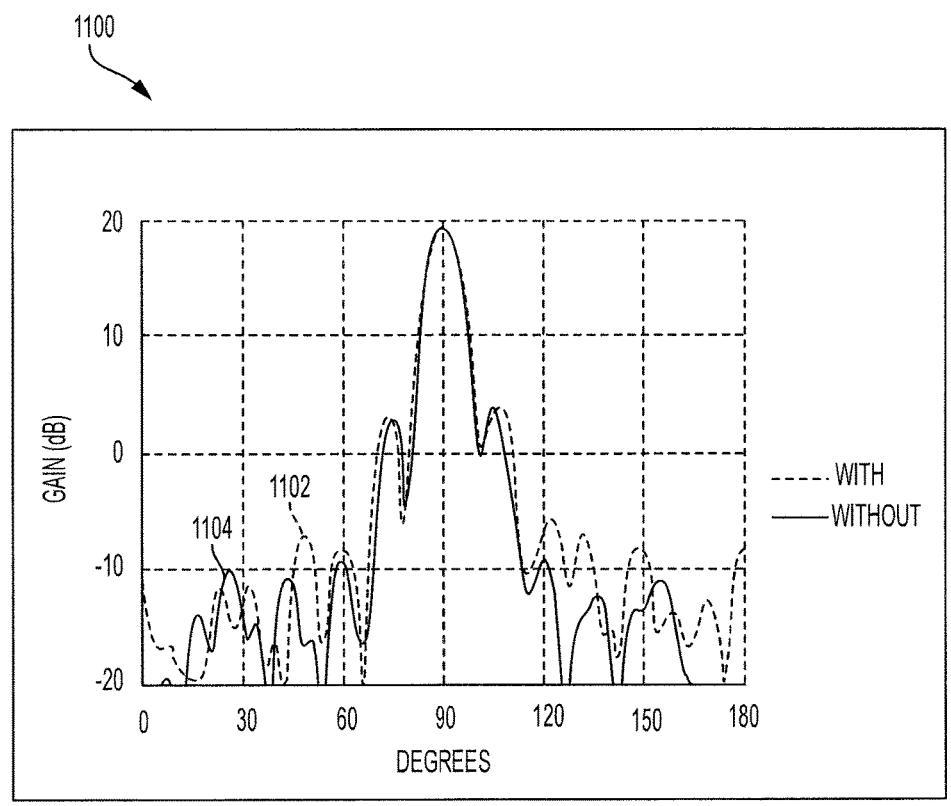
FIG. 11 is a graph illustrating a far field pattern of an antenna array coupled to the radar mount of FIG. 5A and a far field pattern of an antenna array suspended in space showing the minimal interference that is caused by the radar mount according to an embodiment of the present invention.

Turning now to FIGS. 5A and 11, a graph 1100 illustrates a far field pattern 1102 of the antenna array 200 within the radar mount 500 and a far field pattern 1104 of the antenna array 200 suspended in space without interference. The X axis illustrates the phase of the signal and the y-axis illustrates the gain of the signal. As shown, the radar mount 500 minimally interferes with the gain of the signal transmitted by the antenna array 200 relative to the signal transmitted by the antenna array 200 suspended in space. This illustrates that the radar mount 500 not only provides structural support for the antenna array 200 but also maintains performance characteristics of the antenna array 200.

Figure 12A:
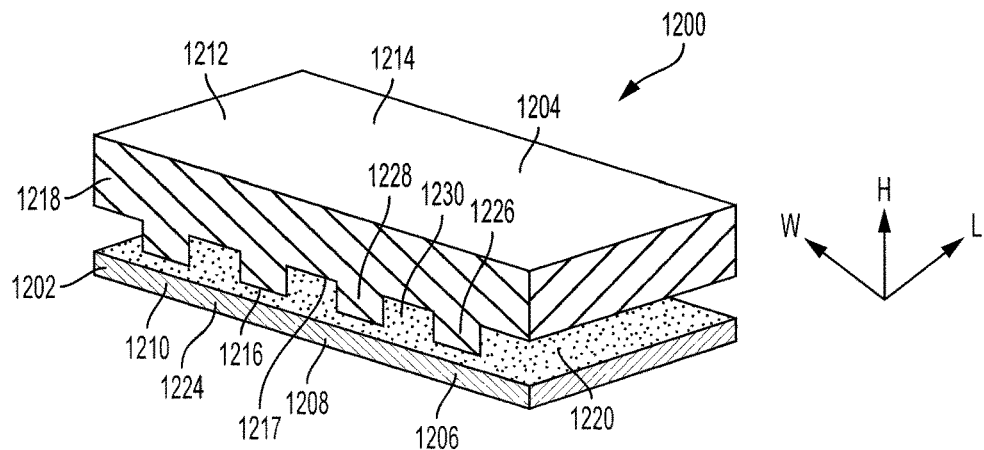
FIG. 12A is a drawing showing a perspective view of an end-fire antenna system having a radar mount with a main body and a plurality of ribs extending from the main body for making contact with antennas of an antenna array according to an embodiment of the present invention.
Figure 12B:
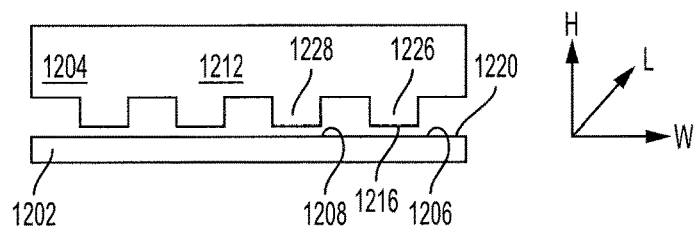
FIG. 12B is a drawing showing a cross-sectional view of the end-fire antenna system of FIG. 12A according to an embodiment of the present invention.
Figure 12C:
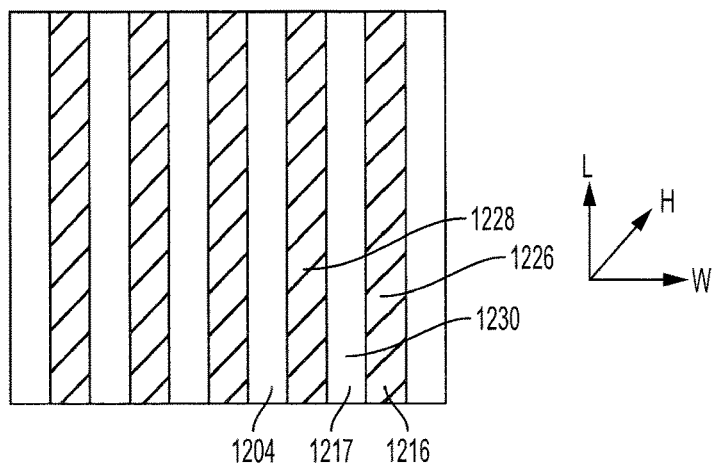
FIG. 12C is a drawing showing a top view of the end-fire antenna system of FIG. 12A according to an embodiment of the present invention.

Turning to FIGS. 12A, 12B, and 12C, another millimeter wave end-fire antenna system includes an end-fire antenna array 1202 and a radar mount 1204. The antenna array 1202 includes similar features as the antenna array 200 of FIG. 5A. For example, the antenna array 1202 includes a plurality of antennas including a first antenna 1206 and a second antenna 1208. Each of the plurality of antennas is positioned on a PCB 1210.

The radar mount 1204 includes a main body 1212 having a top 1214 and a bottom 1217. The radar mount 1204 also includes a plurality of ribs including a first rib 1226 and a second rib 1228. Each of the plurality of ribs may be separated by a space. For example, the first rib 1226 and the second rib 1228 may be separated by a space 1230. The main body 1212 of the radar mount 1204 is continuous along the W-L plane. In some embodiments, the main body 1212 may be aligned with the entirety of each of the plurality of ribs along the W-L plane. In some embodiments, the main body 1212 may be considered a large crossbeam as it extends across the plurality of ribs along the W axis.

Each of the plurality of ribs of the radar mount 1204 may include similar dimensions as the plurality of ribs 502 of the radar mount 500 of FIG. 5A. In some embodiments, the plurality of ribs of the radar mount 1204 may not extend beyond a front 1224 of the antenna array 1202. That is, a front 1218 of the radar mount 1204 and the front 1224 of the antenna array 1202 may be positioned at the same location along the L axis. In some embodiments, the front 1218 of the radar mount 1204 may extend beyond the front 1224 of the antenna array 1202 along the L axis, and in some embodiments, the front 1224 of the antenna array 1202 may extend beyond the front 1218 of the radar mount 1204 along the L axis.

Each of the plurality of ribs has a bottom 1216 that is farther in the negative H direction than the bottom 1217 of the main body 1212. In that regard, when the radar mount 1204 is coupled to the antenna array 1202, the bottom 1216 of the first rib 1226 may contact a top 1220 of the first antenna 1206 in a similar manner as the first rib 400 of FIG. 5A contacts the first antenna 202 of FIG. 5A.

Figure 13A:
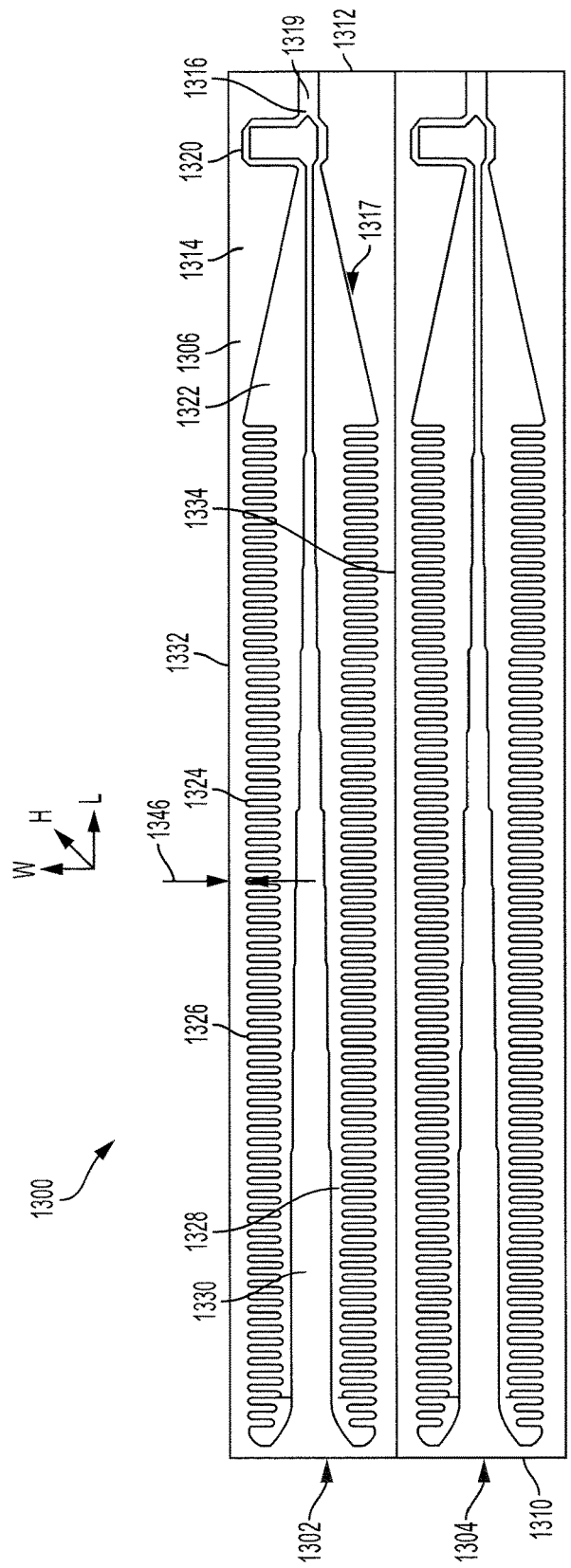
FIG. 13A is a drawing showing a top view of an antenna array having two tapered-slot end-fire antennas having finger ground structures for providing increased rigidness according to an embodiment of the present invention.

Turning to FIGS. 13A, 13B, and 13C, a top view, a bottom view, and a side view, respectively, of an end-fire antenna array 1300 having a first tapered-slot end-fire antenna 1302 and a second tapered-slot end-fire antenna 1304 are shown.

The first antenna 1302 has a top 1306 and a bottom 1308. The first antenna 1302 also has a transmission end 1310 from which a wireless radar signal is transmitted and a chip connection end 1312 from which the first antenna 1302 may be connected to an antenna controller or a processor.

The first antenna 1302 includes a PCB 1314 and metal 1316. The metal 1316 may be formed, printed, etched, or otherwise deposited onto the PCB 1314. In some embodiments, the metal 216 may include tin, gold, nickel, any other conductive metal, or any combination thereof. The metal 1316 may form an antenna structure 1317 and a ground connection 1318.

The antenna structure 1317 may include a chip connection lead 1319, a balun 1320, a tapered section 1322, and a wave section 1324. The wave section 1324 may include a first wave section 1326 positioned proximate to a first outer edge 1332 of the first antenna 1302 and a second wave section 1328 positioned proximate to a second outer edge 1334 of the first antenna 1302. The second outer edge 1334 may be a physical edge of the PCB 1314 or may be a logical edge referring to the intersection of the first antenna 1302 and the second antenna 1304 when both are printed on the same PCB. The first wave section 1326 and the second wave section 1328 may be separated in the W direction by a space 1330.

The chip connection lead 1319, the balun 1320, the tapered section 1322, and the wave section 1324 operate and function in a similar manner as the chip connection lead 219, the balun 220, the tapered section 222, and the wave section 224 of the first antenna 202 of FIG. 2A.

The ground connection 1318 may include a main ground section 1336, a first finger 1338, and a second finger 1340. One or more of the main ground section 1336, the first finger 1338, or the second finger 1340 may be coupled to an electrical ground.

In some embodiments, the main ground section 1336 may have a width 1337 that extends from the first outer edge 1332 to the second outer edge 1334. In some embodiments, the width 1337 may be less than the entire distance from the first outer edge 1332 to the second outer edge 1334. The main ground section 1336 may extend for a distance 1339 from the chip connection end 1312 towards the transmission end 1310. The distance 1339 may or may not affect the performance of the antenna array 1300.

The first finger 1338 may be positioned adjacent to the first outer edge 1332 and the second finger 1340 may be positioned adjacent to the second outer edge 1334. The first finger 1338 and the second finger 1340 may extend beyond the main ground section 1336 towards the transmission end 1310.

The PCB 1314 may have a length 1342. For example, the length 1342 may be between 10 mm and 30 mm. The first finger 1338 and the second finger 1340 may extend for a distance 1344 from the chip connection end 1312 towards the transmission end 1310. In some embodiments, the distance 1344 may be between 40% and 60%, such as 50%, of the total value of the length 1342 of the PCB 1314. Experimentation and simulation has shown that benefits are achieved when the distance 1344 is between 40% and 60% of the total value of the length 1342 of the PCB 1314. When this is the case, the first finger 1338 and the second finger 1340 minimally interfere with the signal transmitted by the first antenna 1302 while desirably providing electrical isolation between the first antenna 1302 and the second antenna 1304. Minimal interference may refer to any interference that distorts the signal transmitted by the first antenna by less than 20%, or less than 10%, or less than 5%, or less than 2.5%.

The greater the distance 1344, the more structural support is provided to the first antenna 1302. In some embodiments, it is preferred for distance 1344 to be 50% of the length 1342, as this ratio may provide an ideal balance of support with minimal signal interference.

The outermost portion of the first wave section 1326 may be separated from the first outer edge 1332 by a distance 1346 in the W direction. The first finger 1338 may have a width 1348 that extends from the first outer edge 1332 towards the second outer edge 1334. In some embodiments, the width 1348 is less than or equal to the distance 1346 between the first wave section 1326 and the first outer edge 1332. Experimentation and simulation has shown that benefits are achieved when the width 1348 is less than or equal to the distance 1346. When this is the case, the first finger 1338 and the second finger 1340 minimally interfere with the signal transmitted by the first antenna 1302 while desirably providing electrical isolation between the first antenna 1302 and the second antenna 1304.

The antenna structure 1317 on the top 1306 of the first antenna 1302 may have a thickness 1350, and the ground connection 1318 on the bottom 1308 of the first antenna 1302 may have a thickness 1352. In some embodiments, the thickness 1352 of the ground connection 1318 may be greater than the thickness 1350 of the antenna structure 1317. Experimentation and simulation has shown that the thickness 1352 of the ground connection 1318 may be greater than the thickness 1350 of the antenna structure 1317 with minimal interference of the signal transmitted by the first antenna 1302. It is desirable for the thickness 1352 to be as great as possible in order to provide desirable rigidity while minimizing interfering with the signal transmitted by the first antenna 1302.

In some embodiments, the thickness 1352 of the ground connection 1318 may be between 17.5 micrometers (17.5 μm) and 105 μm, or between 17.5 μm and 210 μm. In some embodiments, the thickness 1352 of the first finger 1338 and/or the second finger 1340 may be greater than the thickness 1352 of the main ground section 1336.

The first finger 1338 has an end 1354 that is nearest to the transmission end 1310. The end 1354 may be curved towards the first outer edge 1332. This curved shape has been shown to minimize interference with the signal transmitted by the first antenna 1302.

Figure 14:
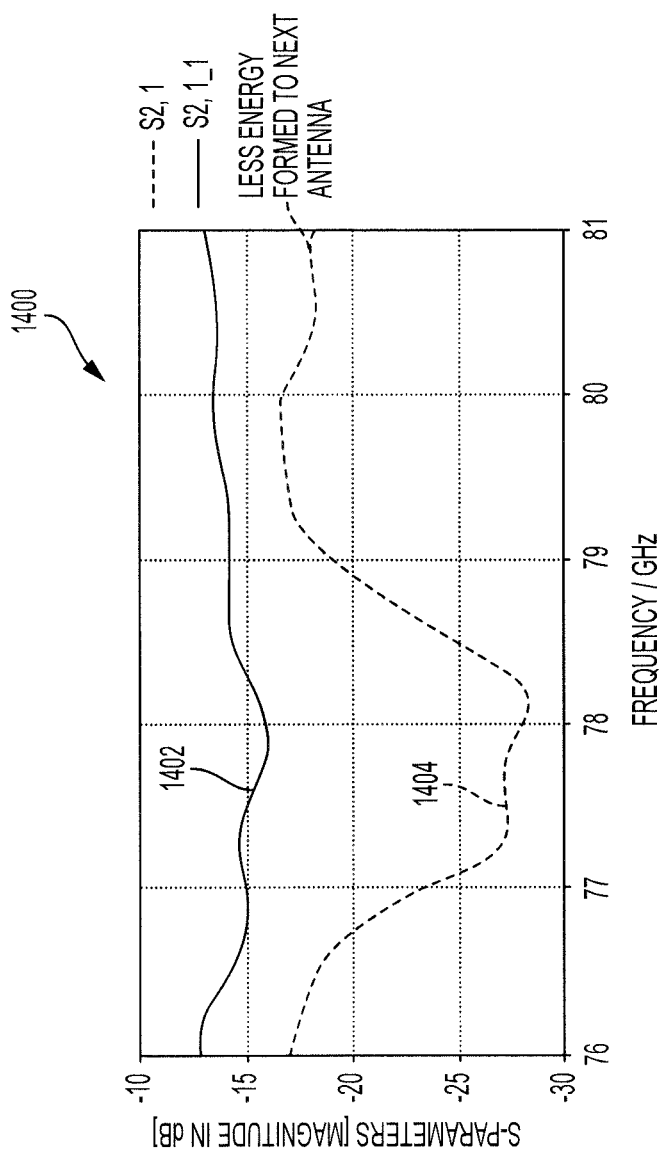
FIG. 14 is a graph illustrating a magnitude of cross-coupling between two neighboring elements of an antenna array that includes a finger ground structure and a magnitude of cross-coupling between two neighboring elements of an antenna array that does not include a finger ground structure over various operating frequencies according to an embodiment of the present invention.

Turning now to FIGS. 13B and 14, a graph 1400 illustrates how inclusion of the first finger 1338 and the second finger 1340 increase isolation of the first antenna 1302 from the second antenna 1304. The X axis represents frequency and the Y axis represents a magnitude of cross-coupling between the first antenna 1302 and the second antenna 1304. The first antenna 1302 and the second antenna 1304 are designed to operate between 77 GHz and 79 GHz.

A first line 1402 represents the magnitude of cross-coupling between a second antenna and a first antenna without fingers included in a ground connection. A second line 1404 represents the magnitude of cross-coupling between the second antenna 1304 and the first antenna 1302 that includes the first finger 1338 and the second finger 1340. As shown in the graph 1400, inclusion of the first finger 1338 and the second finger 1340 reduces cross-coupling between the second antenna 1304 and the first antenna 1302 by between 5 decibels (dB) and 10 dB within the operating range of 77 GHz to 79 GHz.

Referring to FIGS. 5A and 13B, the antenna array 1300 may be mounted within the radar mount 500. The support provided by the fingers 1338, 1340 and by the radar mount 500 is greater than the support provided by either of the fingers 1338, 1340 or the radar mount 500 alone. Furthermore, by using the antenna array 1300 with the radar mount 500, the resulting end-fire antenna system would include the rigidity provided by both features along with the isolation between antennas that is provided by the fingers 1338, 1340.

Exemplary embodiments of the methods/systems have been disclosed in an illustrative style. Accordingly, the terminology employed throughout should be read in a nonlimiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A structurally supported millimeter-wave end-fire antenna system for use in vehicular radar systems comprising:
   a first longitudinal rib having a width, a height that is greater than the width, and a length that is greater than the height, defining a first longitudinal slot extending for a portion of the length of the first longitudinal rib, and having a transmission end and a chip connection end;
   a second longitudinal rib parallel to the first longitudinal rib, having a width, a height that is greater than the width, and a length that is greater than the height, defining a second longitudinal slot extending for a portion of the length of the first longitudinal rib, and having a transmission end and a chip connection end;
   a longitudinal crossbeam coupled to the first longitudinal rib and the second longitudinal rib and extending in a direction perpendicular to the first longitudinal rib and the second longitudinal rib;
   a first end-fire antenna having a height that is less than the height of the first longitudinal rib, a transmission end that is received by the first longitudinal slot such that the transmission end of the first longitudinal rib extends beyond the transmission end of the first end-fire antenna, and a chip connection end that extends beyond the chip connection end of the first longitudinal rib, and configured to transmit a first signal having a first phase; and
   a second end-fire antenna having a height that is less than the height of the first longitudinal rib, a transmission end that is received by the second longitudinal slot such that the transmission end of the second longitudinal rib extends beyond the transmission end of the second end-fire antenna, and a chip connection end that extends beyond the chip connection end of the second longitudinal rib, and configured to transmit a second signal having a second phase that is different than the first phase.

2. The millimeter-wave end-fire antenna system of claim 1 wherein the width of the first longitudinal rib is less than a quarter of a size of a wavelength of the first signal and the height of the first longitudinal rib is greater than or equal to two times the size of the wavelength of the first signal.

3. The millimeter-wave end-fire antenna system of claim 1 wherein the first end-fire antenna has a balun proximate to the chip connection end of the first end-fire antenna that is exposed when the transmission end of the first end-fire antenna is received by the first longitudinal slot.

4. The millimeter-wave end-fire antenna system of claim 1 wherein the first signal is transmitted from the transmission end of the first end-fire antenna and wherein the transmission end of the first longitudinal rib has an ellipsoid shape having a vertex extending away from the first longitudinal slot for focusing a wave of the first signal.

5. The millimeter-wave end-fire antenna system of claim 1 wherein a material of the first longitudinal rib has a loss tangent that is less than 0.01 and an epsilon permittivity that is between 1 and 3.

6. The millimeter-wave end-fire antenna system of claim 1 further comprising:
   a printed circuit board having an antenna controller for the first end-fire antenna and the second end-fire antenna and on which the first end-fire antenna and the second end-fire antenna are positioned; and
   a rectangular frame that defines the first longitudinal rib, the second longitudinal rib, and the longitudinal crossbeam and has a first frame portion and a second frame portion such that at least a portion of the printed circuit board is sandwiched between the first frame portion and the second frame portion.

7. The millimeter-wave end-fire antenna system of claim 1 further comprising a third longitudinal rib defining a third longitudinal slot, a fourth longitudinal rib defining a fourth longitudinal slot, a third end-fire antenna positioned within the third longitudinal slot, and a fourth end-fire antenna positioned within the fourth longitudinal slot, wherein the third longitudinal rib is stacked above the first longitudinal rib and the fourth longitudinal rib is stacked above the second longitudinal rib such that the longitudinal crossbeam is at least partially positioned between the first longitudinal rib and the third longitudinal rib and at least partially positioned between the second longitudinal rib and the fourth longitudinal rib.

8. A structurally supported millimeter-wave end-fire antenna system for use in vehicular radar comprising:
   a first end-fire antenna having a top and a bottom and configured to transmit a first signal having a first phase;
   a second end-fire antenna having a top and a bottom and configured to transmit a second signal having a second phase;
   a first longitudinal rib having a first slat positioned on the top of the first end-fire antenna and a second slat positioned on the bottom of the first end-fire antenna such that the first end-fire antenna is sandwiched between the first slat and the second slat of the first longitudinal rib;
   a second longitudinal rib having a first slat positioned on the top of the second end-fire antenna and a second slat positioned on the bottom of the second end-fire antenna such that the second end-fire antenna is sandwiched between the first slat and the second slat of the second longitudinal rib;
   a crossbeam coupled to the first longitudinal rib and the second longitudinal rib and extending in a direction perpendicular to the first longitudinal rib and the second longitudinal rib; and
   a third end-fire antenna having a top and a bottom;
   a fourth end-fire antenna having a top and a bottom;
   a third longitudinal rib parallel to the first longitudinal rib and the second longitudinal rib, positioned above the first longitudinal rib, and having a first slat positioned on the top of the third end-fire antenna and a second slat positioned on the bottom of the third end-fire antenna such that the second slat of the third longitudinal rib is proximate to the first slat of the first longitudinal rib; and
   a fourth longitudinal rib parallel to the third longitudinal rib, positioned above the second longitudinal rib, and having a first slat positioned on the top of the fourth end-fire antenna and a second slat positioned on the bottom of the fourth end-fire antenna such that the second slat of the fourth longitudinal rib is proximate to the first slat of the second longitudinal rib.

9. The millimeter-wave end-fire antenna system of claim 8 wherein the first end-fire antenna has a longitudinal orientation and is parallel to the first longitudinal rib and wherein the first longitudinal rib has a width that is less than a quarter of a size of a wavelength of the first signal and a height that extends perpendicular to a length of the first end-fire antenna for a distance that is greater than or equal to two times the size of the wavelength of the first signal.

10. The millimeter-wave end-fire antenna system of claim 8 wherein the first end-fire antenna has a transmission end from which the first signal is propagated and the first longitudinal rib has a transmission end that extends beyond the transmission end of the first end-fire antenna and has an ellipsoid shape having a vertex extending away from the first end-fire antenna for focusing a wave of the first signal.

11. The millimeter-wave end-fire antenna system of claim 8 wherein the crossbeam is a main body that is aligned with an entirety of the first longitudinal rib and the second longitudinal rib and is continuous along a first plane that is parallel to a second plane defined by the first end-fire antenna and the second end-fire antenna.

12. The millimeter-wave end-fire antenna system of claim 8 wherein the first end-fire antenna has a chip connection end and a balun proximate to the chip connection end that is exposed when the first end-fire antenna is sandwiched between the first slat and the second slat of the first longitudinal rib.

13. A structurally supported millimeter-wave end-fire antenna system for use in vehicular radar systems comprising:
  a radar mount having:
  a first longitudinal rib defining a first longitudinal slot,
  a second longitudinal rib defining a second longitudinal slot, and
  at least one cross-beam coupled to the first longitudinal rib and the second longitudinal rib;
  a first end-fire antenna formed on a first printed circuit board and configured to be received by the first longitudinal slot;
  a second end-fire antenna formed on the first printed circuit board and configured to be received by the second longitudinal slot; and
  a third longitudinal rib stacked above or below the first longitudinal rib, spaced from the first longitudinal rib by the at least one cross-beam, and defining a third longitudinal slot;
  a fourth longitudinal rib stacked above or below the second longitudinal rib, spaced from the second longitudinal rib by the at least one cross-beam, and defining a fourth longitudinal slot;
  a third end-fire antenna formed on a second printed circuit board and configured to be received by the third longitudinal slot; and
  a fourth end-fire antenna formed on the second printed circuit board and configured to be received by the fourth longitudinal slot.

14. The structurally supported millimeter-wave end-fire antenna system of claim 13 wherein:
  each of the first longitudinal rib, the second longitudinal rib, the first end-fire antenna, and the second end-fire antenna have a transmission end and a chip connection end; and
  the transmission end of the first longitudinal rib and the second longitudinal rib extend for a distance beyond the transmission end of the first end-fire antenna, and the second end-fire antenna.

15. The structurally supported millimeter-wave end-fire antenna system of claim 14 wherein the transmission end of the first longitudinal rib forms an ellipsoid shape having a vertex extending away from the transmission end of the first end-fire antenna for focusing a wave transmitted by the first end-fire antenna.

16. The structurally supported millimeter-wave end-fire antenna system of claim 13 wherein:
  the first end-fire antenna includes a transmission end, a chip connection end, and a balun located proximate to the chip connection end;
  the first end-fire antenna includes a wave section extending towards the transmission end from the balun and having a first wave section having a first plurality of wave-shaped structures and a second wave section having a second plurality of wave-shaped structures;
  the first end-fire antenna includes a tapered section that is tapered from the wave section to the balun; and
  the first longitudinal rib is located between the first wave section and the second wave section and contacts the first end-fire antenna at a location along the tapered section.

17. The structurally supported millimeter-wave end-fire antenna system of claim 13 wherein the first end-fire antenna is configured to transmit a signal having a wavelength, and the first longitudinal rib has a width that is less than a quarter of a size of the wavelength of the signal transmitted by the first end-fire antenna.

18. The structurally supported millimeter-wave end-fire antenna system of claim 13 further comprising:
  an antenna controller positioned on the first printed circuit board and configured to control operation of the first end-fire antenna and the second end-fire antenna; and
  a frame configured to at least partially house the first printed circuit board and configured to be coupled to or to define the first longitudinal rib and the second longitudinal rib.

* * * * *